(12) United States Patent
Nielsen et al.

(10) Patent No.: US 7,483,590 B2
(45) Date of Patent: Jan. 27, 2009

(54) IMAGE PROCESSING APPARATUS AND IMAGE PROCESSING METHOD FOR NON-PLANAR IMAGE, STORAGE MEDIUM, AND COMPUTER PROGRAM

(75) Inventors: Frank Nielsen, Tokyo (JP); Kosuke Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 10/451,945

(22) PCT Filed: Oct. 10, 2002

(86) PCT No.: PCT/JP02/10541

§ 371 (c)(1),
(2), (4) Date: Jul. 16, 2004

(87) PCT Pub. No.: WO03/038752

PCT Pub. Date: May 8, 2003

(65) Prior Publication Data

US 2004/0247173 A1    Dec. 9, 2004

(30) Foreign Application Priority Data

Oct. 29, 2001    (JP)    ............................ 2001-331508

(51) Int. Cl.
*G06K 9/36* (2006.01)
*G06K 9/00* (2006.01)
*G06T 15/00* (2006.01)
*G06F 17/00* (2006.01)

(52) U.S. Cl. .................... 382/285; 382/154; 345/419

(58) Field of Classification Search ............... 382/100, 382/154, 285, 286, 293, 294, 298, 300; 348/48, 348/42, 46; 345/418, 419, 424, 582, 585
See application file for complete search history.

(56) References Cited

U.S. PATENT DOCUMENTS

| | | | |
|---|---|---|---|
| 5,023,725 A | 6/1991 | McCutchen | |
| 5,657,073 A | 8/1997 | Henley | |
| 6,669,346 B2 * | 12/2003 | Metcalf | 353/94 |
| 6,788,333 B1 * | 9/2004 | Uyttendaele et al. | 348/36 |
| 7,197,192 B2 * | 3/2007 | Edwards | 382/284 |
| 7,262,789 B2 * | 8/2007 | Jones | 348/36 |
| 7,277,118 B2 * | 10/2007 | Foote | 348/36 |

FOREIGN PATENT DOCUMENTS

JP    09-062861    3/1997

(Continued)

OTHER PUBLICATIONS

Kosuke Suzuki, et al., "Robust Registration of Panoramic Image through Multiframe Registration", Dept. of Electronics and Communication Engineering, Waseda University, D-11-98, p. 98, Mar. 8, 1999.

(Continued)

*Primary Examiner*—Yon Couso
(74) *Attorney, Agent, or Firm*—Finnegan, Henderson, Farabow, Garrett & Dunner, L.L.P.

(57) ABSTRACT

Such processes as compression, storage and reproduction of an image mapped on a three-dimensional coordinate system such as a spherical surface or a cylindrical surface are performed suitably by mapping omnidirectional map information to a two-dimensional image such that the redundancy may be low while the amounts of information is kept equal as far as possible with minimized errors. Preferably, the image is converted into a two-dimensional image in a form determined taking the performance of the omnidirectional video image reproduction side into consideration. The technique can be utilized when mapping information which describes a corresponding relationship between the three-dimensional coordinate system of the original omnidirectional image and the mapped two-dimensional image coordinate system is produced to synthesize an omnidirectional video image from an arbitrary viewpoint direction.

17 Claims, 28 Drawing Sheets

FOREIGN PATENT DOCUMENTS

| | | |
|---|---|---|
| JP | 10-013623 | 1/1998 |
| JP | 10-136263 | 5/1998 |
| JP | 2000-011172 | 1/2000 |
| JP | 2000-11172 | 1/2000 |
| JP | 2000-67227 | 3/2000 |
| JP | 2000-067227 | 3/2000 |
| JP | 2000-137800 | 5/2000 |

OTHER PUBLICATIONS

Kosuke et al., "Robust Composition of Omni-directional panorama image by multi-image integration", Proceedings of General Symposium 1999 of Institute of Electronics, Information and Communication Engineers, D-11-98, p. 98, Mar. 8, 1999.

Joseph O'Rourke; Computational Geometry col. 31; Department of Computer Science, Smith College, Northampton, MA; Mar. 24, 1997.

Bogner S L: "An introduction to Panospheric Imaging", Systems, Man and Cypernetics, 1995, Intelligent Systems for the 21st Century, IEEE International Conference on Vancouver, BC, Canada Oct. 22-25, 1995, vol. 4, pp. 3099-3106.

J. Snyder, "Map Projections Used by the U.S. Geological Survey", 1982, United States Government Printing Office, pp. 6-52.

L. Bugayewskiy, J. Snyder, "Map Projections—A Reference Manual", 1995, Taylor & Francis, p. 49-52.

T. Wong et al., "Sampling with Hammersley and Halton Points", Journal of Graphics Tools, vol. 2, No. 2, 1997, pp. 9-24.

* cited by examiner

10 OMNIDIRECTIONAL VIDEO IMAGE PRODUCTION SYSTEM 11-1 OMNIDIRECTIONAL IMAGE PICKUP APPARATUS

F I G. 6

TWO-DIMENSIONAL IMAGE
MAPPING INFORMATION
(Θ, Φ, TX, TY, r)

OMNIDIRECTIONAL VIDEO IMAGE,
AUDIO

..................................

TWO-DIRECTIONAL IMAGE
MAPPING INFORMATION
(Θ, Φ, TX, TY, r)

OMNIDIRECTIONAL VIDEO IMAGE,
AUDIO

F I G. 1 2
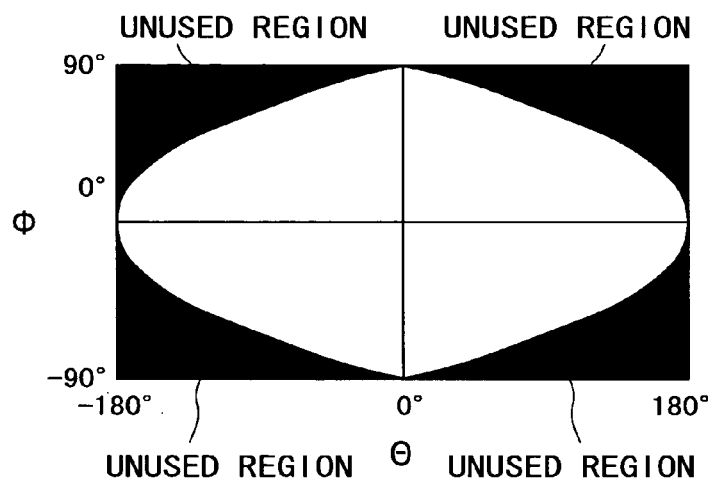
F I G. 1 3
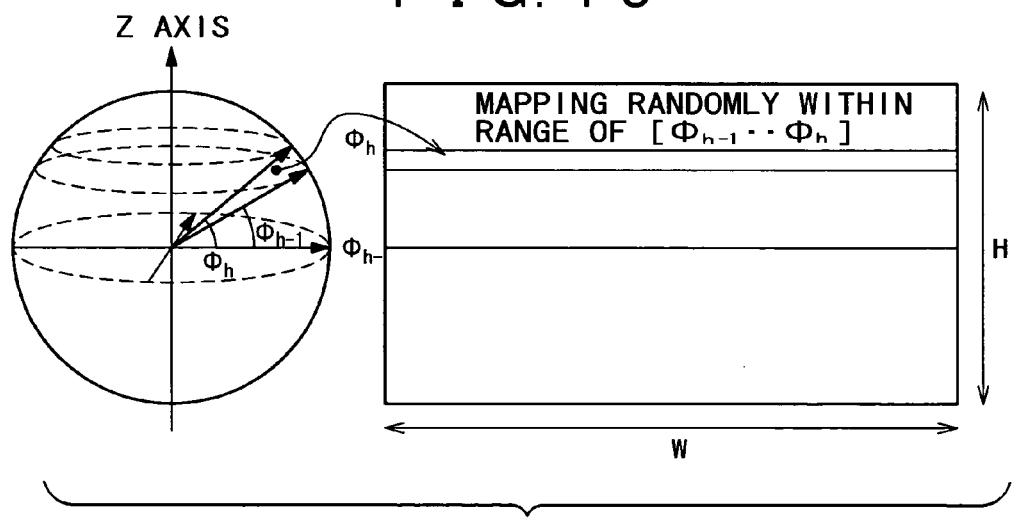

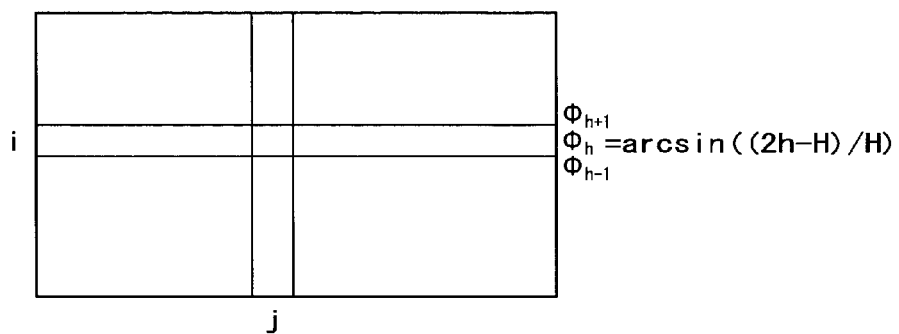
F I G. 1 4

F I G. 1 8
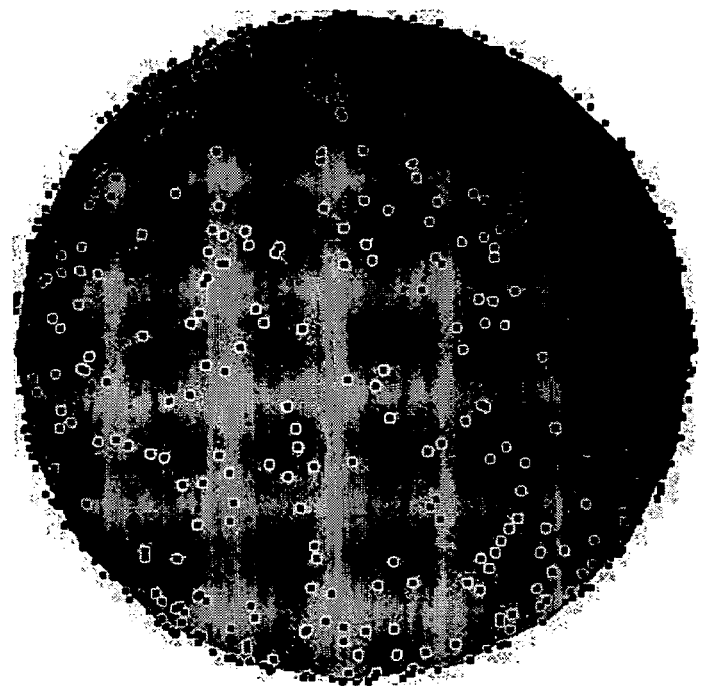
F I G. 1 9
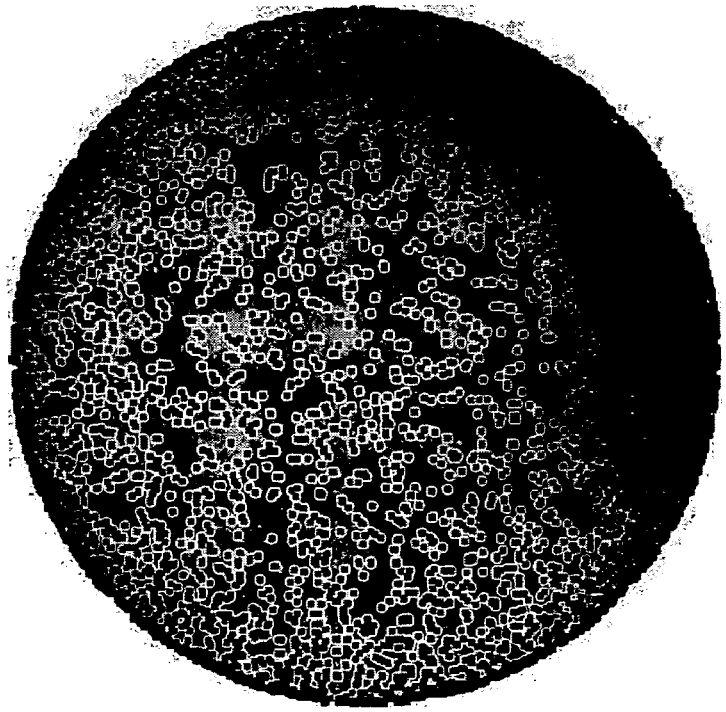

iw+jth PIXEL BY HAMMERSLEY SEQUENCE

F I G. 2 2
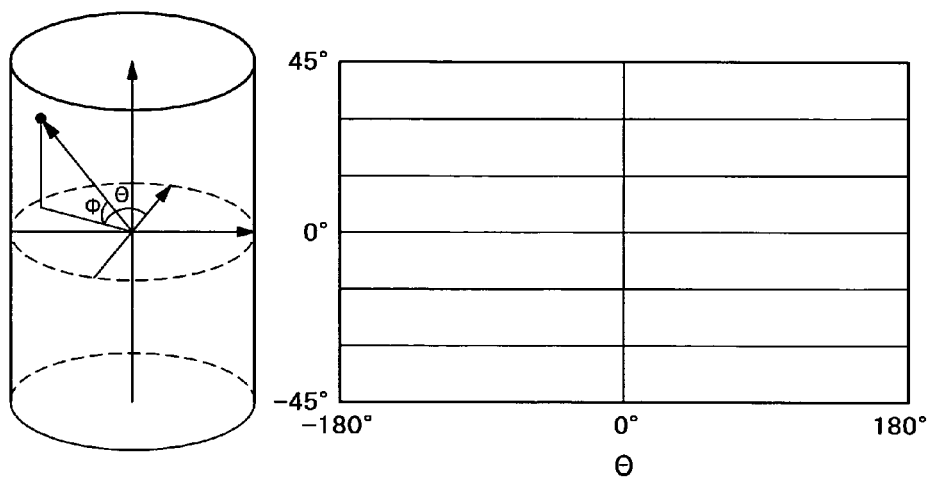
F I G. 2 3
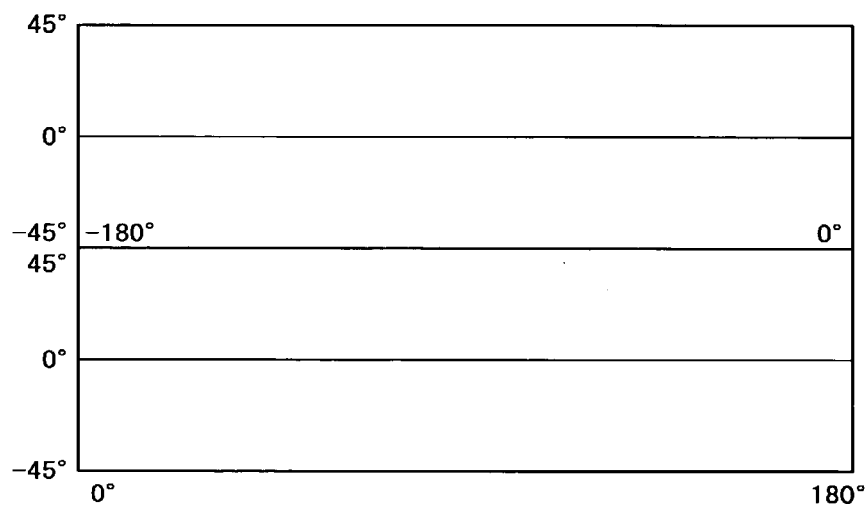

OMNIDIRECTIONAL IMAGE MAPPED
ON TWO-DIMENSIONAL PLANE

SYNTHESIZED VIEW-
POINT DIRECTION
IMAGE

IMAGE OBTAINED BY TWO-DIMENSIONAL MAPPING OF SPHERICAL
OR CYLINDRICAL OMNIDIRECTIONAL IMAGE (HOWEVER, WHERE
EQUAL DIVISION OR PATCHING IS NOT PERFORMED)

IMAGE OBTAINED BY TWO-DIMENSIONAL MAPPING OF SPHERICAL OR CYRINDRICAL OMNIDIRECTIONAL IMAGE
(HOWEVER, WHERE EQUL DIVISION OR PATCHING IS NOT PERFORMED)

F I G. 3 4
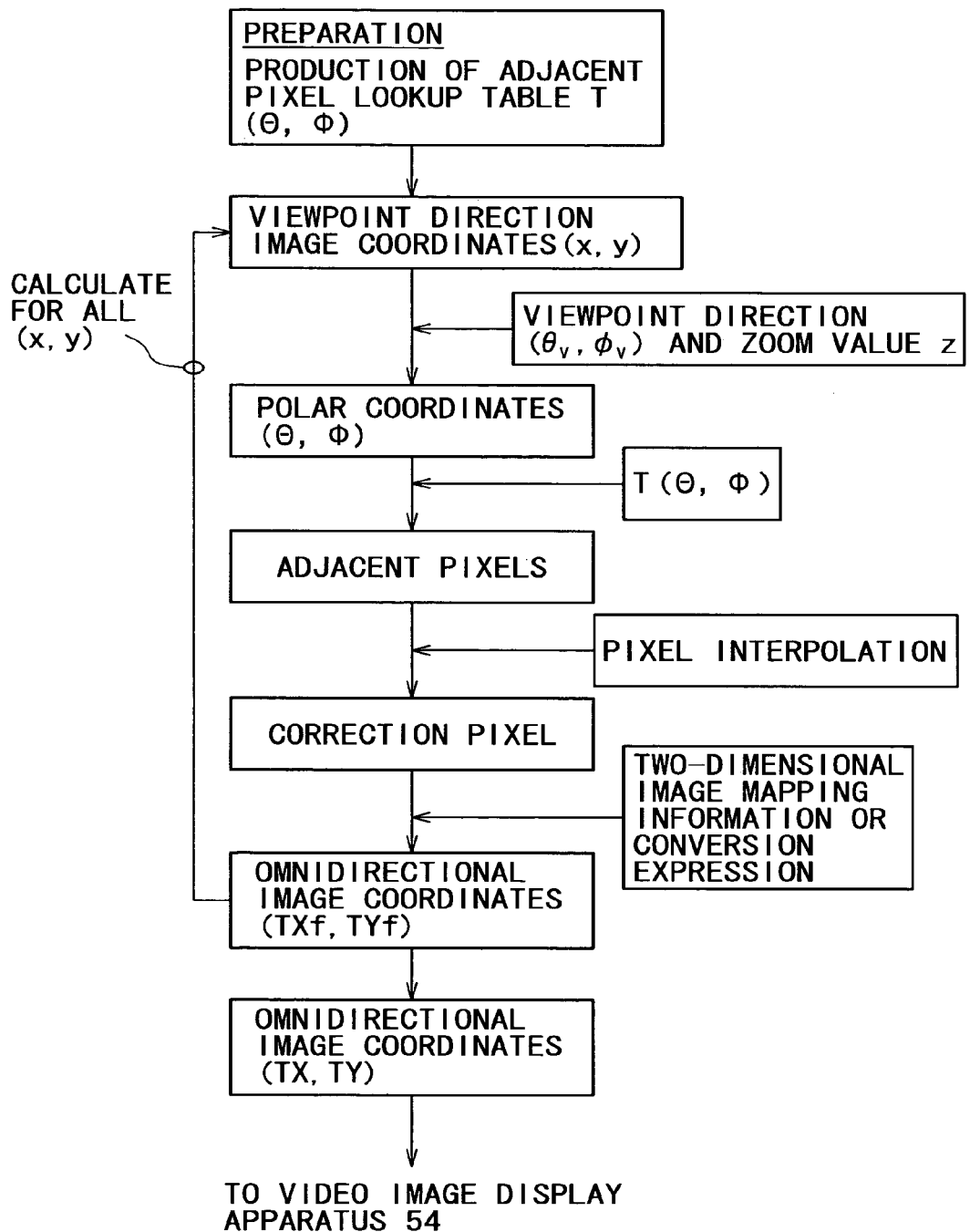

F I G. 3 5
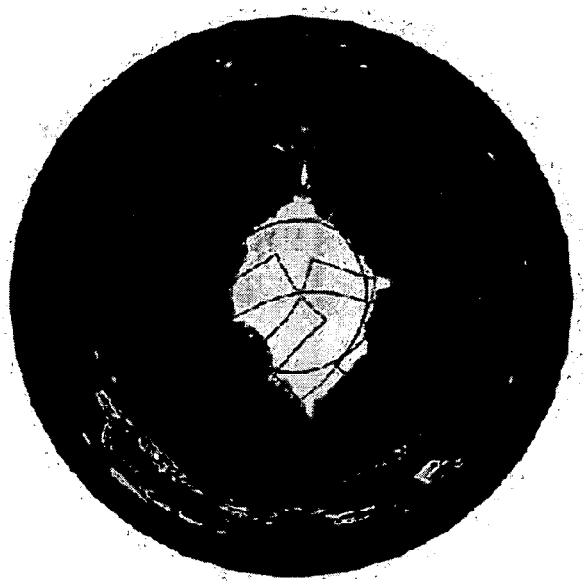

F I G. 3 6
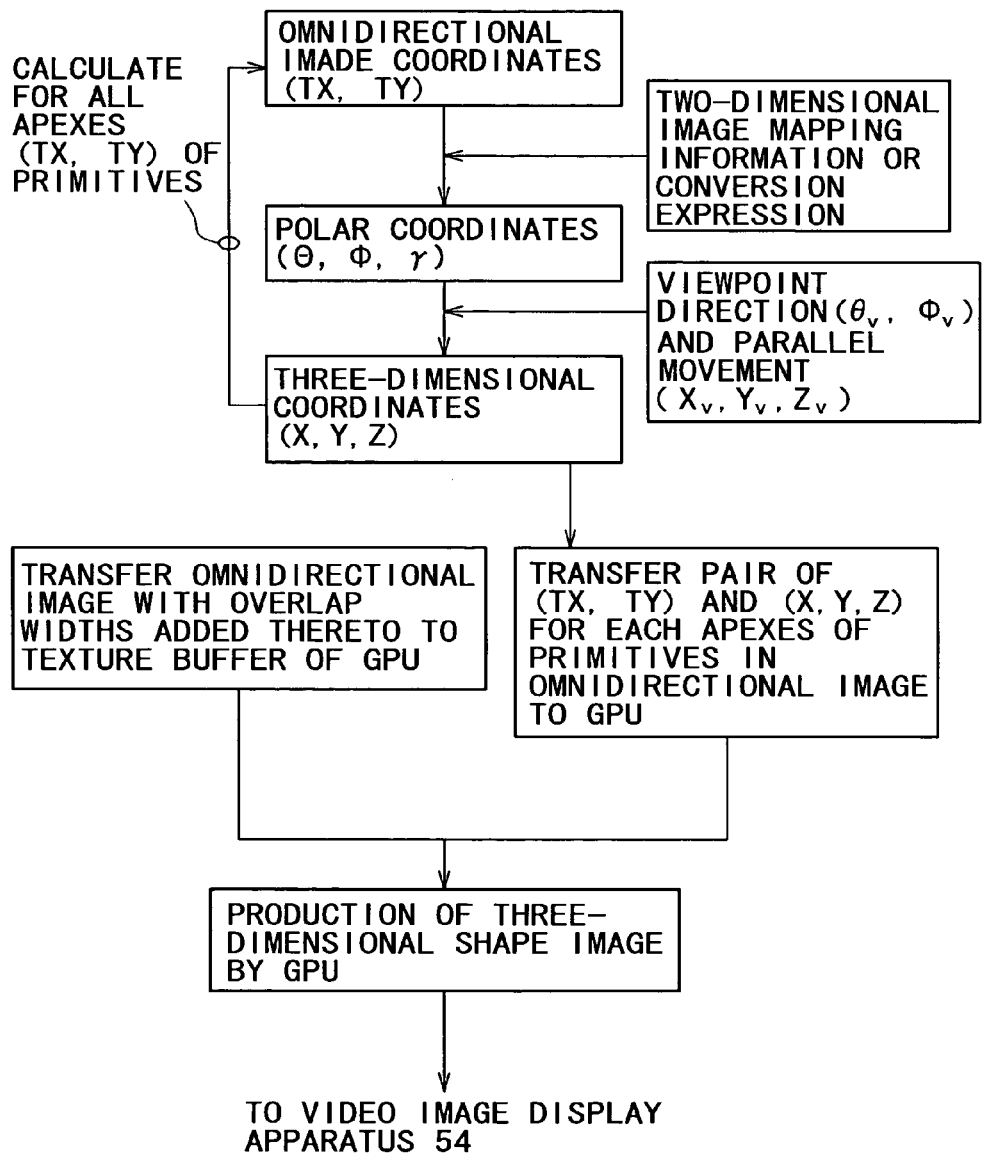

IMAGE PROCESSING APPARATUS AND IMAGE PROCESSING METHOD FOR NON-PLANAR IMAGE, STORAGE MEDIUM, AND COMPUTER PROGRAM

TECHNICAL FIELD

This invention relates to an image processing apparatus and an image processing method, a storage medium, and a computer program wherein such processes as compression, storage and reproduction are performed for video image data picked up by a camera, and more particularly to an image processing apparatus and an image processing method, a storage medium, and a computer program wherein such processes as compression, storage and reproduction are performed for an image formed by patching video image data picked up by a plurality of cameras.

More specifically, the present invention relates to an image processing apparatus and an image processing method, a storage medium, and a computer program wherein such processes as compression, storage and reproduction are performed for an image formed as a non-planar image by patching video image data picked up by a plurality of cameras, and more particularly to an image processing apparatus and an image processing method, a storage medium, and a computer program wherein processing of a cylindrical or spherical image derived from an omnidirectional camera or a full celestial sphere type camera formed from a plurality of cameras disposed so as to pickup images around a certain one point in a space determined as a viewpoint is performed.

BACKGROUND ART

An omnidirectional camera is known as an apparatus for providing a landscape image around a user. An omnidirectional video image system of the type mentioned is typically formed from a plurality of cameras disposed so as to pickup images around a certain one point in a space determined as a viewpoint. An omnidirectional video image system formed from a plurality of cameras performs an image process of connecting boundaries of picked up images of adjacent ones of the cameras to produce an image over a wide region much greater than the visual field of each of the cameras as an image which looks as if it were picked up by a single wide angle camera.

Although a camera can pickup an image over a wide range if a lens having a wide view angle is used for the camera, the resolution decreases as much and details of a picked up image become less distinguishable. In contrast, where an omnidirectional video image system is used, a picked up image over a wide range can be provided with a high resolution maintained.

Where such an omnidirectional video image as just described is used, an image of the free viewpoint type can be watched. For example, in a television game wherein a character (the cast) can move freely in a space, a background screen from an arbitrary viewpoint can be displayed. Consequently, it becomes possible to enjoy the game through more realistic video image and is augmented in the entertaining degree.

Further, although an omnidirectional video image has a greater capacity compared with an ordinary video image, since it is superior in the interactivity, it is promising as new contents in the broadband network age.

Several proposals have been made for the omnidirectional video image system. For example, in Japanese Patent Laid-Open No. Hei 9-62861, a panorama video image editing apparatus which can display a panorama video image wherein the viewpoint and the direction of the line of sight are continuously changed in response to the designation of the user has been disclosed. The panorama video image editing apparatus disclosed in the publication mentioned synthesizes, based on image data of images picked up around a point which moves drawing an arbitrary locus in a space and is determined as a viewpoint, panorama images from the individual viewpoints and sets successive viewpoint position information to the individual panorama images. Upon reproduction, the panorama video image editing apparatus calculates the position of each display image in the space from the information of the viewpoint position and the direction of the visual line of the display image and information of the directions of movement of the viewpoint and the visual line inputted by the user to synthesize the display images.

However, conventionally the publication mentioned above does not particularly suppose such a situation that the real time performance is required with regard to the synthesis of video images of a high picture quality such as those of a television set as a display apparatus or video images from arbitrary viewpoints. Further, the publication mentioned above has not mentioned about a method of storing omnidirectional video images taking the performance or conditions of the image display or reproduction side. Furthermore, the publication mentioned above does not take into consideration an image storage method which not only views in an arbitrary viewpoint direction from the inner side but also takes utilization from the outside into consideration.

DISCLOSURE OF INVENTION

It is an object of the present invention to provide an image processing apparatus and an image processing method, a storage medium, and a computer program which are superior in that such processes as compression, storage and reproduction can be performed suitably for an image formed as a non-planar image by patching video image data picked up by a plurality of cameras.

It is another object of the present invention to provide an image processing apparatus and an image processing method, a storage medium, and a computer program which are superior in that a cylindrical or spherical image derived from an omnidirectional camera or a full celestial sphere type camera formed of a plurality of cameras disposed so as to pickup images around a certain one point in a space determined as a viewpoint.

It is a further object of the present invention to provide an image processing apparatus and an image processing method, a storage medium, and a computer program wherein a non-planar image such as an omnidirectional video image can be stored and processed taking the performance of the display or reproduction side into consideration.

The present invention has been made in view of the subjects described above, and according to an aspect of the present invention, there is provided an image processing apparatus or an image processing method for a non-planar image for processing a non-planer image represented on a three-dimensional coordinate system, characterized in that it comprises two-dimensional planar image mapping means for or step of mapping a non-planar image represented on a three-dimensional coordinate system to a two-dimensional plane, and mapping information production means for or step of producing mapping information which describes a corresponding relationship between the three-dimensional coordinate system representing the original non-planar image and the mapped two-dimensional image coordinate system.

Here, the non-planar image represented on the three-dimensional coordinate system is, for example, a spherical omnidirectional image. In this instance, preferably the two-dimensional planar image mapping means converts omnidirectional pixel information with minimized errors into a two-dimensional image of a low redundancy while keeping the amount of information equal as far as possible. Further, preferably an omnidirectional video image is converted into a two-dimensional image in a form determined taking the performance of a system side which reads the omnidirectional video image into consideration.

Further, the two-dimensional image mapping information signifies information which describes a corresponding relationship between a three-dimensional coordinate system ($\Theta$, $\Phi$, r) of an original omnidirectional image and a mapped two-dimensional image coordinate system (TX, TY) and is required when an omnidirectional video image from an arbitrary viewpoint direction is synthesized. The two-dimensional image mapping information is information necessary to reproduce the omnidirectional video image in an arbitrary shape when the omnidirectional video image is to be observed from the outer side.

The two-dimensional planar image mapping means or step may allocate an angle in a horizontal direction of the spherical surface to a horizontal direction of the two-dimensional plane and allocate an angle in a vertical direction of the spherical surface to a vertical direction of the two-dimensional plane both in an equally spaced relationship from each other. In this instance, the mapping information production means may produce mapping information described in angles in a horizontal direction and a vertical direction on the spherical surface allocated to rows and columns of the two-dimensional planar image.

Where such a mapping method as described above is used, there is an advantage that the spatial and temporal correlation is high and a conversion expression from a spherical surface to a two-dimensional plane, that is, two-dimensional mapping information, is simple. Further, a human being can easily grasp an entire image of the original omnidirectional image from the mapped two-dimensional planar image. However, the distortion at upper and lower portions (in the case of a map, pole portions) of the mapped two-dimensional plane is greater (the density becomes lower when compared with that around the equator), and the amounts of information included in the individual pixels cannot be kept equal in omnidirections.

Alternatively, the two-dimensional planar image mapping means may allocate an angle in a horizontal direction and/or a vertical direction of the spherical surface in an arbitrarily spaced relationship to a horizontal direction and/or a vertical direction of the two-dimensional plane. For example, it is possible to provide such flexibility that the density, that is, the amount of information, in a region sectioned in certain angular ranges in the horizontal direction and the vertical direction is increased. In this instance, the two-dimensional image mapping information is the angles allocated to each of the rows and columns.

Further, where the non-planar image represented on the three-dimensional coordinate system is a spherical omnidirectional image, the two-dimensional planar image mapping means or step may project a spherical surface to a cylinder such that an area ratio may be correct and expand the cylinder to a plane to map the same to the two-dimensional planar image.

With such a mapping method as described above, due to the equal-area feature, there are advantages that the amounts of information included in pixels are equal to each other, that the spatial and temporal correlation is high, and that a conversion expression from a spherical surface into a two-dimensional plane, that is, two-dimensional image mapping information, is simple.

Further, the two-dimensional planar image mapping means or step may map the non-planar image represented on the three-dimensional coordinate system to the two-dimensional planar image such that the amounts of information included in the pixels may be kept equal to each other in omnidirections.

It can be taken as an example that, for example, where the non-planar image represented on the three-dimensional coordinate system is a spherical omnidirectional image, pixels can be sampled uniformly from a spherical surface if the two-dimensional planar image mapping means utilizes a theorem that, when the z axis of a sphere is cut at equal intervals with parallel planes, the areas on the sphere defined by adjacent ones of the planes are equal to map regions on the sphere sectioned within equally spaced ranges in the Z axis direction on the three-dimensional polar coordinate system randomly to belt-like planar regions sectioned within equally spaced ranges on a two-dimensional orthogonal coordinate system.

However, such a mapping method as just described has drawbacks that somewhat greater amount of calculation processing is required and that an entire image of an original omnidirectional image cannot be grasped readily from an image mapped to a two-dimensional plane. Further, since the two-dimensional image mapping information is described in a unit of a pixel, the mapping method cannot be used for a system wherein display or reproduction of an omnidirectional video image is performed for each region. Furthermore, since an omnidirectional video image is mapped to pixels at random places, when the omnidirectional video image is displayed or reproduced from the two-dimensional image, in order to interpolate the pixel value at a point ($\Theta$, $\Phi$), adjacent pixels must be searched out efficiently.

Further, the two-dimensional planar image mapping means or step may map, to a point at the ith row of the jth column of the two-dimensional planar image wherein one row includes w pixels, a point extracted at the iw+jth from the omnidirectional image using a Hammersley Sequence. By this, a non-planar image represented on a three-dimensional coordinate system can be mapped to a two-dimensional planar image such that the amount of information included in the pixels may be kept more equally in omnidirections.

However, such a mapping method as just described has drawbacks that somewhat greater amount of calculation processing is required and that an entire image of an original omnidirectional image cannot be grasped readily from an image mapped to a two-dimensional plane. Further, since the two-dimensional image mapping information is described in a unit of a pixel, the mapping method cannot be used for a system wherein display or reproduction of an omnidirectional video image is performed for each region. Furthermore, since adjacent pixels are not necessarily mapped in a neighboring relationship, when the omnidirectional video image is displayed or reproduced from the two-dimensional image, in order to interpolate the pixel value at a point ($\Theta$, $\Phi$), adjacent pixels must be searched out efficiently.

Further, where the non-planar image represented on the three-dimensional coordinate system is a cylindrical omnidirectional image, the two-dimensional planar image mapping means or step may cut the cylinder vertically, expand the cylinder into rectangles, divide the rectangular image equally into divisional pieces and dispose the divisional pieces in order from above so as to satisfy a prescribed format size.

Further, the image processing apparatus and the image processing method for a non-planar image according to the first aspect of the present invention may further include image compression means for or step of compressing the mapped two-dimensional planar image information in a predetermined compression format.

For a moving picture, a compression format of the MPEG-1, MPEG-2, MPEG-4, H.263, H.261, AVI, Motion JPEG or the like may be adopted and, for a still picture, a compression format of the JPEG, GIF, PNG, BMP, TIFF or the like may be adopted.

For example, where a spherical omnidirectional video image is projected to a cylinder such that the area ratio may be correct and the cylinder is expanded to a plane to map the same to a two-dimensional planar image, an unused region in which no pixel is mapped is produced with the two-dimensional planar image information. By allocating the same pixel value to such an unused region as just mentioned, the spatial and temporal correlation is raised, and consequently, the compression ratio can be raised.

As described already, the mapping information is data necessary to synthesize an omnidirectional video image from an arbitrary viewpoint direction. Thus, the image processing apparatus or the image processing method for a non-planar image according to the first aspect of the present invention may further include data format conversion means for or step of converting the data format into a data format which includes a set of the two-dimensional planar image mapped by the two-dimensional planar image mapping means or step or a compressed image of the two-dimensional planar image and the mapping information produced by the mapping information production means or step.

Further, the data format conversion means or step may insert audio information in an interleaved relationship in such a form that the audio information is synchronized with the video image information.

Further, the data format conversion means or step may insert the mapping information into the top of a frame every time a mapping method adopted by the two-dimensional planar image mapping means or step changes over.

Meanwhile, according to a second aspect of the present invention, there is provided an image processing apparatus or an image processing method for displaying a non-planar image of a three-dimensional coordinate system mapped on a two-dimensional planar image as a video image, characterized in that it comprises indication means for or step of designating a viewpoint direction and/or a zoom value, and video image production means for or step of producing a three-dimensional shape video image in an arbitrary viewpoint direction in accordance with the designated viewpoint direction and/or zoom value using mapping information when the non-planar image is mapped to the two-dimensional plane image.

Here, the video image production means or step performs re-mapping from the non-planar video image mapped on the two-dimensional plane to a two-dimensional display screen of a predetermined video image display apparatus.

The video image production means or step may include means for or step of calculating polar coordinates from the viewpoint direction and/or zoom value of each of the pixels of the viewpoint direction video image, and means for or step of referring to the two-dimensional image mapping information to convert the polar coordinates into omnidirectional image coordinates, and the omnidirectional video image in the arbitrary viewpoint direction may be synthesized or processed in a unit of a pixel.

Alternatively, the video image production means or step may include means for or step of converting omnidirectional image coordinates of each of apexes of primitives included in the omnidirectional video image into polar coordinates using the two-dimensional image mapping information, means for or step of converting the polar coordinates into viewpoint direction image coordinates from the viewpoint direction and/or zoom value, and means for or step of producing a viewpoint direction image in a unit of a primitive using the omnidirectional video image as a texture, and the omnidirectional video image in the arbitrary viewpoint direction may be synthesized and processed in a unit of a region.

Further, the video image production means or step may further include means for or step of interpolating a pixel based on adjacent pixels of the omnidirectional video image. Further, appearance of a break at which pixels have not been corrected can be prevented by disposing, upon pixel interpolation, in the proximity of each of the opposite left and right ends of the omnidirectional image, a pixel region duplicated by a predetermined width from the other end.

Further, the video image production means or step may include means for or step of producing a lookup table for searching for adjacent pixels with regard to each of pixels of the two-dimensionally mapped omnidirectional image, means for or step of calculating polar coordinates from the viewpoint direction and zoom value of each of the pixels of the viewpoint direction video image, means for or step of referring to the lookup table to search for pixels neighboring with the polar coordinates corresponding to the pixel of the viewpoint direction video image, means for or step of interpolating the polar coordinates of the pixel using the adjacent pixels, and means for or step of referring to the two-dimensional image mapping information to convert the polar coordinates into the omnidirectional image coordinates.

Such video image production means or step as described above can synthesize the omnidirectional video image in the arbitrary viewpoint direction from a two-dimensional planar image wherein, utilizing a theorem that, when the z axis of a sphere is cut with parallel planes at equal intervals, the areas on the spherical surface defined by adjacent ones of the planes are constant, regions on the spherical surface sectioned within equally spaced ranges in the Z axis direction on a three-dimensional polar coordinate system are mapped randomly to belt-like planar regions sectioned within equally spaced ranges on a two-dimensional orthogonal coordinate system or a two-dimensional planar image wherein a point extracted at the iw+jth from the omnidirectional image using a Hammersley Sequence is mapped to map the non-planar image represented on the three-dimensional coordinate system such that the amount of information included in the maps may be kept more equally in omnidirections.

Further, the video image production means can falsely realize video images picked up by cameras of different types of lenses when the viewpoint is on the inner side upon synthesis of an arbitrary viewpoint direction video image. For example, based on an omnidirectional video image composed of video images originally picked up by pinhole cameras, a viewpoint image which looks as if it were picked up by means of a fisheye lens can be synthesized.

Further, the video image production means may produce an omnidirectional video image of an arbitrary three-dimensional shape when the viewpoint is on the outer side upon synthesis of an arbitrary viewpoint direction video image. For example, if the viewpoint is designated to the outer side of a polygon or the like, then an omnidirectional video image can be patched to the surface of the polygon. By this, it can be anticipated that unprecedented GUI (Graphical User Interface) becomes available.

According to a third aspect of the present invention, there is provided a storage medium on which computer software described such that a process of a non-planer image represented on a three-dimensional coordinate system is executed on a computer system is physically stored in a computer-readable form, characterized in that the computer software includes a two-dimensional planar image mapping step of mapping a non-planar image represented on a three-dimensional coordinate system to a two-dimensional plane, and a mapping information production step of producing mapping information which describes a corresponding relationship between the three-dimensional coordinate system representing the original non-planar image and the mapped two-dimensional image coordinate system.

Meanwhile, according to a fourth aspect of the present invention, there is provided a storage medium on which computer software described such that a process for displaying a non-planar image of a three-dimensional coordinate system mapped on a two-dimensional planar image as a video image is executed on a computer system is physically stored in a computer-readable form, characterized in that the computer software includes an indication step of designating a viewpoint direction and/or a zoom value, and a video image production step of producing a three-dimensional shape video image in an arbitrary viewpoint direction in accordance with the designated viewpoint direction and/or zoom value using mapping information when the non-planar image is mapped to the two-dimensional plane image.

The recording media according to the third and fourth aspects of the present invention are media which provide computer software in computer-readable form, for example, to a computer system for universal use which can execute various program codes. Such media are removable and portable storage media such as, for example, a DVD (Digital Versatile Disc), a CD (Compact Disc), an FD (Flexible Disk) and an MO (Magneto-Optical disc) and so forth. Or, it is also technically possible to provide computer software to a particular computer system through a transmission medium such as a network (the network may be any of a radio network and a wire network).

Such a recording medium as just described defines a structural or functional cooperative relationship between predetermined computer software and the storage medium for implementing functions of the computer software on a computer system. In other words, if predetermined computer software is installed into a computer system through the recording medium according to the third or fourth aspect of the present invention, then cooperative actions are exhibited on the computer system, and operation and effects similar to those of the image processing apparatus or the image processing method for a non-planar image according to the first or second aspect of the present invention can be achieved.

According to a fifth aspect of the present invention, there is provided a computer program described in a computer-readable form such that a process of a non-planer image represented on a three-dimensional coordinate system is executed on a computer system, characterized in that it includes a two-dimensional planar image mapping step of mapping a non-planar image represented on a three-dimensional coordinate system to a two-dimensional plane, and a mapping information production step of producing mapping information which describes a corresponding relationship between the three-dimensional coordinate system representing the original non-planar image and the mapped two-dimensional image coordinate system.

According to a sixth aspect of the present invention, there is provided a computer program described in a computer-readable form such that a process for displaying a non-planar image of a three-dimensional coordinate system mapped on a two-dimensional planar image as a video image is executed on a computer system, characterized in that it includes an indication step of designating a viewpoint direction and/or a zoom value, and a video image production step of producing a three-dimensional shape video image in an arbitrary viewpoint direction in accordance with the designated viewpoint direction and/or zoom value using mapping information when the non-planar image is mapped to the two-dimensional plane image.

The computer programs according to the fifth and sixth aspects of the present invention define computer programs described in a computer-readable form such that a predetermined process is implemented on a computer system. In other words, if the computer program according to the fifth or sixth aspect of the present invention is installed into a computer system, then cooperative actions are exhibited on the computer system, and operation and effects similar to those of the image processing apparatus or the image processing method for a non-planar image according to the first or second aspect of the present invention can be achieved.

Further objects, features and advantages of the present invention will become apparent from more detailed description based on an embodiment of the present invention hereinafter described and the accompanying drawings.

BRIEF DESCRIPTION OF THE DRAWINGS

FIG. 6 is a view showing an example of a configuration of a data format which includes a set of two-dimensional image mapping information and video image data after conversion by an omnidirectional video image data format conversion section 26;

FIG. 12 is a view illustrating a manner wherein the same background color is allocated to an unused region of the two-dimensional mapping image shown in FIG. 11;

FIG. 13 is a view illustrating a concept of the Stratified Random method;

FIG. 14 is a view illustrating a processing procedure of the Stratified Random method;

FIG. 18 is a view illustrating a manner wherein 1,000 sample points are extracted from a spherical surface using random numbers;

FIG. 19 is a view illustrating a manner wherein 10,000 sample points are extracted from a spherical surface using random numbers;

FIG. 22 is a view illustrating a method of mapping a cylindrical omnidirectional video image to a two-dimensional plane;

FIG. 23 is a view illustrating a manner wherein a rectangular image expanded from a cylindrical image is divided into two halves and the right half of them is patched to the bottom of the left half of them to adjust the aspect ratio;

FIG. 34 is a view schematically illustrating flows of data for reproducing a three-dimensional video image in an arbitrary viewpoint direction from a two-dimensional image mapped based on a mathematical technique;

FIG. 35 is a view showing a viewpoint image produced where a fisheye lens is used;

FIG. 36 is a view schematically illustrating flows of data for synthesizing a video image of an arbitrary three-dimensional shape from an omnidirectional video image mapped on a two-dimensional plane;

BEST MODE FOR CARRYING OUT THE INVENTION

In the following, an embodiment of the present invention is described with reference to the drawings.

A. Omnidirectional Video Image Production System

Figure 1:
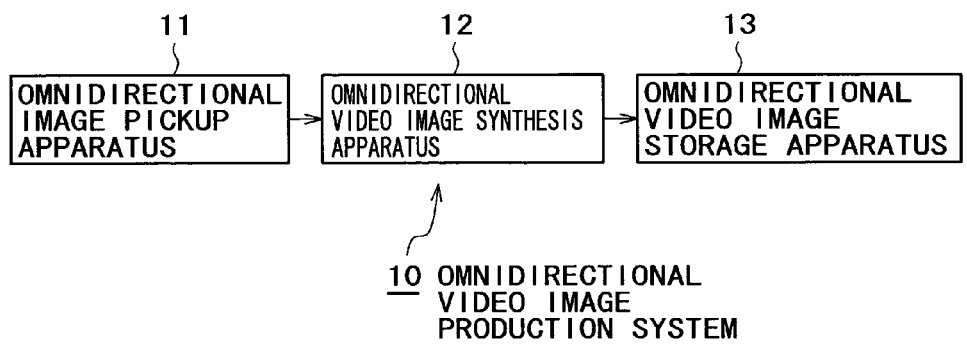
FIG. 1 is a view schematically showing a configuration of an omnidirectional video image production system 10 used to carry out the present invention.

FIG. 1 schematically shows a configuration of an omnidirectional video image production system 10 used to carry out the present invention. As shown in FIG. 1, the omnidirectional video image production system 10 includes an omnidirectional image pickup apparatus 11, an omnidirectional video image synthesis apparatus 12 and an omnidirectional video image storage apparatus 13.

The omnidirectional image pickup apparatus 11 is configured such that N cameras are disposed so that they can pickup video images in omnidirections from a center at a certain one viewpoint in a space. The following arrangement configuration examples of the cameras are available.

(1) A configuration wherein the N cameras are arranged radially. For example, a configuration wherein pinhole cameras are disposed individually on composing faces of a polyhedron such as a regular dodecahedron.

(2) Another configuration wherein the N cameras are disposed such that they can pickup images divisionally in a horizontal direction through reflecting mirrors.

(3) A further configuration wherein an image of a half celestial sphere is picked up by a single camera in which a fisheye lens is used.

(4) A still further configuration wherein an image of an omnidirectional (full celestial sphere) video image is picked up by a combination of two cameras in which a fisheye lens is used.

(5) A yet further configuration wherein a single camera is rotated around a viewpoint thereof to pickup an image in omnidirections.

A-1. Omnidirectional Image Pickup Apparatus

Figure 2:
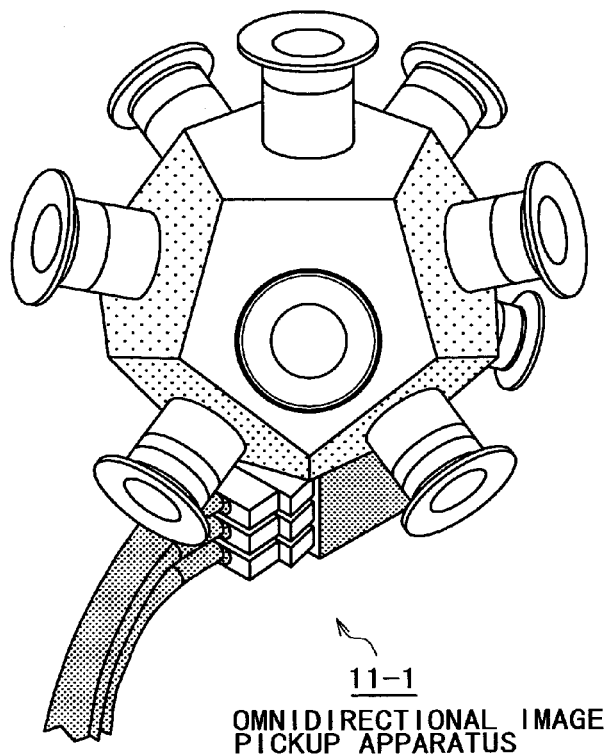
FIG. 2 is a view showing an example of a configuration of the omnidirectional image pickup apparatus 11.

FIG. 2 shows an example of a configuration of an omnidirectional image pickup apparatus 11 which adopts the configuration (1) described above. The omnidirectional image pickup apparatus 11-1 includes a frame of a shape substantially of a dodecahedron (Dodecahedron) having twelve substantially pentagonal component planes and eleven cameras each disposed on one of the faces of the frame. Each camera can pickup an image of a region allocated thereto from within a surrounding landscape and supply the image as part of a surrounding image. Each camera is a camera of the pinhole type having a projection center and may be, for example, a CCD (Charge Coupled Device) camera wherein a microlens is incorporated on the surface of each device. The component plane that corresponds to the bottom face of the frame is used as a pedestal. Cables for external outputting picked up image data by the cameras are connected to one side face of the pedestal. A spherical omnidirectional image is obtained by patching video images of the cameras.

Figure 3:
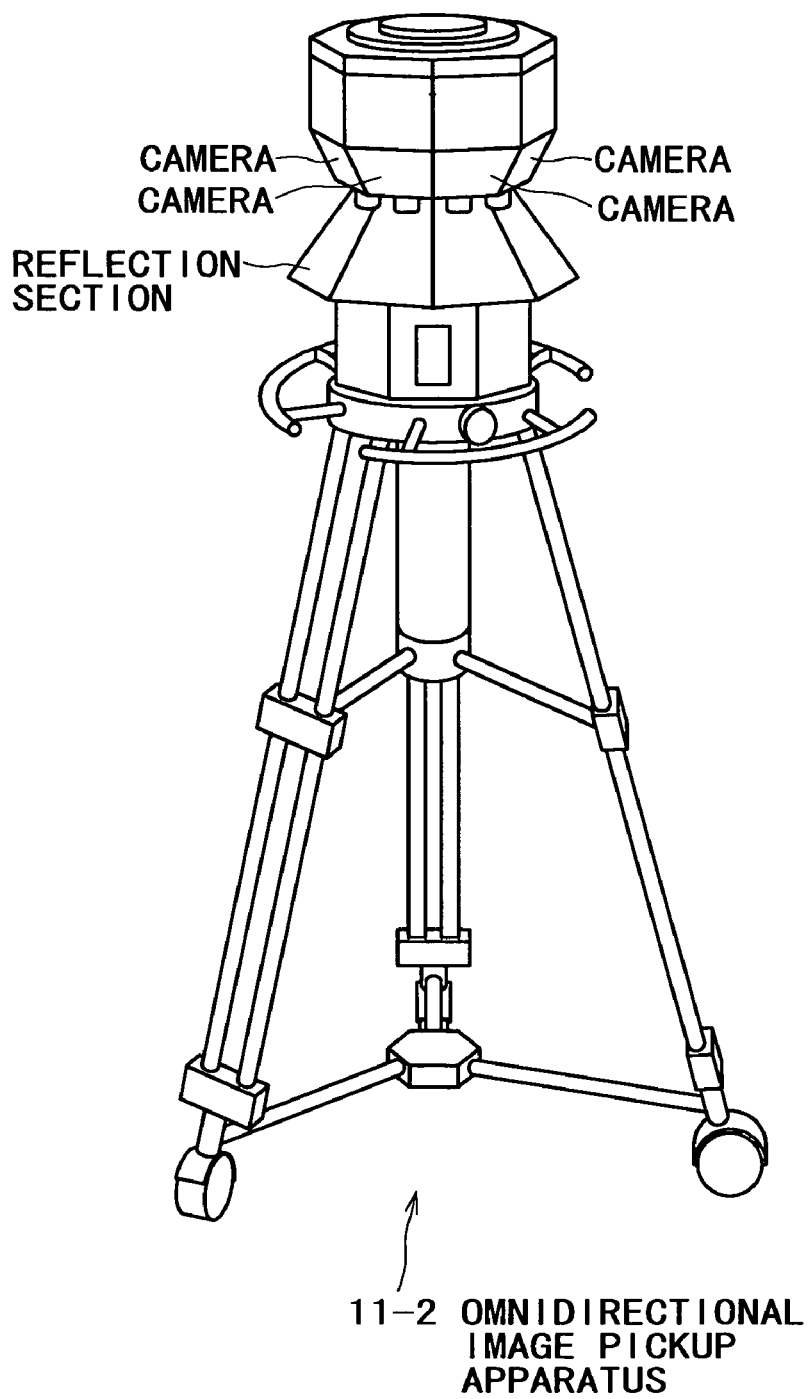
FIG. 3 is a view showing another example of a configuration of the omnidirectional image pickup apparatus 11.
Figure 4:
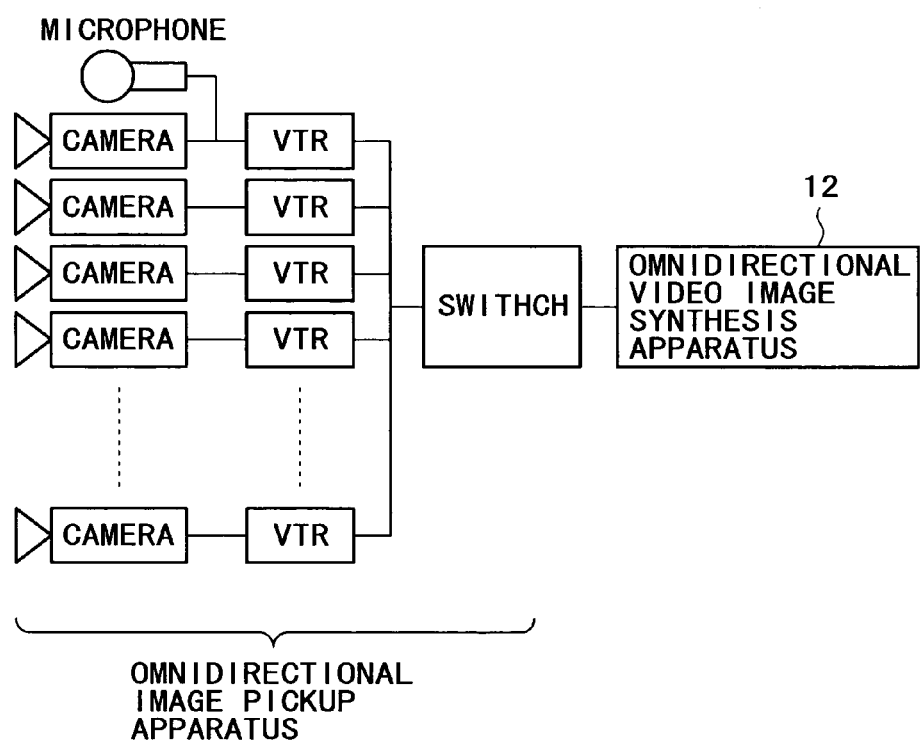
FIG. 4 is a view showing an example of a configuration of the omnidirectional image pickup apparatus 11.

Meanwhile, FIG. 3 shows an example of a configuration of the omnidirectional image pickup apparatus 11 that adopts the configuration (2) described hereinabove. The omnidirectional image pickup apparatus 11-2 includes eight cameras disposed in a substantially equally spaced relationship from each other in a predetermined circumferential direction, and a reflection section wherein eight plane mirrors disposed individually in line-of-sight directions of the cameras are disposed on an octagonal pyramid for the individual cameras. Here, the cameras are disposed such that the projection centers thereof coincide with each other in the proximity of the center of the omnidirectional image pickup apparatus 11-2 and the line-of-sight directions of the cameras are spaced from each other by a predetermined angular distance on one horizontal plane. Since an image of a surrounding landscape reflected by the plane mirrors is picked up by the cameras directed in the reflecting directions, the omnidirectional image pickup apparatus 11-2 can generally pickup mirror images of a video image over 360 degrees in the horizontal direction. A cylindrical omnidirectional image can be obtained by performing such processes as reversal and patching of video images of the cameras.

Where VTRs are connected individually to the cameras as seen in FIG. 4, totaling eight video image (and audio) streams can be recorded. The thus recorded video image streams are video image-captured through a switch and fetched as computer data (a bit map file) into an omnidirectional video image synthesis apparatus 12 in the next stage so that various data works such as three-dimensional image mapping to a spherical surface or a cylinder can be performed.

A-2. Omnidirectional Video Image Synthesis Apparatus

Figure 5:
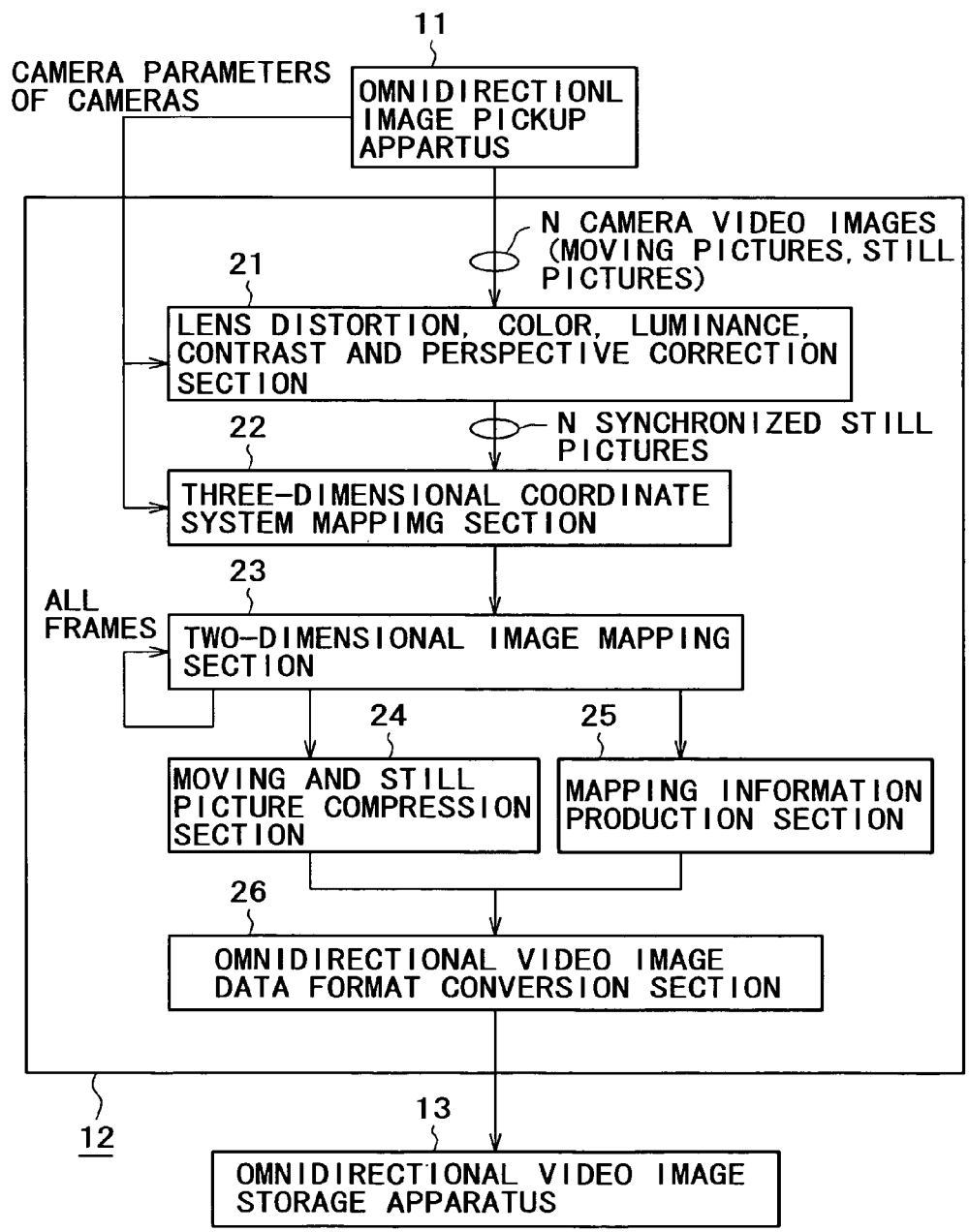
FIG. 5 is a view schematically showing a functional configuration of an omnidirectional video image synthesis apparatus 12.

FIG. 5 schematically shows a functional configuration of the omnidirectional video image synthesis apparatus 12. Referring to FIG. 5, the omnidirectional video image synthesis apparatus 12 includes a lens distortion, luminance, contrast and perspective correction section 21, a three-dimensional coordinate system mapping section 22, a two-dimensional image mapping section 23, moving and still picture compression section 24, a mapping information production section 25 and an omnidirectional video image data format conversion section 26.

The lens distortion, luminance, contrast and perspective correction section 21 receives video image data (moving pictures or still pictures) of the N cameras picked up by the omnidirectional image pickup apparatus 11 as inputs thereto and performs such processes as lens distortion correction, color correction, luminance correction, contrast correction and perspective correction based on camera parameters of the cameras in a unit of one frame.

The three-dimensional coordinate system mapping section 22 selects those still pictures which are in synchronism with each other one by one from N video images corrected by the correction section 21 and maps the N images to a spherical or cylindrical surface on one three-dimensional coordinate system (polar coordinate system) using the N images and camera parameters of the corresponding cameras used for the image pickup.

The two-dimensional image mapping section 23 maps an image mapped on a three-dimensional coordinate system such as a spherical surface or a cylindrical surface to a two-dimensional planar image. Preferably, omnidirectional pixel information is converted with minimized errors into a two-dimensional image of a low redundancy while keeping the amount of information equal as far as possible. Further, preferably an omnidirectional video image is converted into a two-dimensional image in a form determined taking the performance of a system (hereinafter described) side which reads the omnidirectional video image into consideration.

It is to be noted that, although several methods of mapping a non-planar image mapped on a three-dimensional coordinate system such as a spherical surface or a cylindrical surface to a two-dimensional image are available, details of them are hereinafter described.

The mapping information production section 25 produces two-dimensional image mapping information necessary for display or reproduction of an image by an omnidirectional video image display system (hereinafter described) in accordance with a mapping method applied by the two-dimensional image mapping section 23. The two-dimensional image mapping information here signifies information which describes a corresponding relationship between a three-dimensional coordinate system ($\Theta$, $\Phi$, r) of an original omnidirectional image and a mapped two-dimensional image coordinate system (TX, TY). The two-dimensional image mapping information is information necessary to reproduce the omnidirectional video image in an arbitrary shape when the omnidirectional video image is to be observed from the outer side (hereinafter described).

The two-dimensional image mapping section 23 performs a mapping process for all frames. Although the mapping method can be changed over in a unit of a frame, in this case, the mapping information production section 25 produces mapping information in each time.

The moving and still picture compression section 24 compresses two-dimensional still pictures or moving pictures produced by the two-dimensional image mapping section 23. For the compression method, the MPEG-1, MPEG-2, MPEG-4, H.263, H.261, AVI, MOTION JPEG and so forth can be used for moving pictures while any existing format which can handle a two-dimensional image such as the JPEG, GIF, PNG, BMF, TIFF and so forth can be used for still pictures.

The omnidirectional video image data format conversion section 26 converts the data format into a data format which includes two-dimensional image mapping information produced by the mapping information production section 25 and a compressed video image produced by the moving and still picture compression section 24 in a set. FIG. 6 schematically shows the structure of the data format just mentioned.

Into the data format illustrated, it is also possible to insert video image information and audio information in an interleaved relationship in such a form that they are synchronized with each other. The two-dimensional image mapping information is inserted into the top of a frame every time a changeover from the two-dimensional image mapping method applied to video image information occurs. In short, where the same two-dimensional image mapping method is used for all frames, only it is required that the two-dimensional image mapping information be included only at the top of the frame. Further, where the display or reproduction side (omnidirectional video image display system) includes necessary two-dimensional mapping information, the two-dimensional mapping information can be omitted from the data format.

For example, if the display or reproduction side tries to reproduce a two-dimensional image in a unit of a pixel, each pixel must have mapping information, and much data is allocated to such mapping information and the amount of data to be allocated to video images or sound decreases. Therefore, it is preferable that mapping information can be omitted. Also, even though it is tried to reproduce a two-dimensional image not in a unit of a pixel but in a unit of a region having a predetermined area, when the two-dimensional image is re-mapped into a three-dimensional coordinate system, such re-mapping can be performed at a higher speed through calculation with a conversion expression than sequential use of two-dimensional image mapping information, then preferably data is reduced by an amount corresponding to the mapping information.

A-3. Omnidirectional Video Image Storage Apparatus

The omnidirectional video image storage apparatus 13 can be configured using a popular external storage apparatus of a computer system such as a hard disk or a DVD (Digital Versatile Disc).

Further, also it is possible to implement the omnidirectional video image synthesis apparatus 12 and the omnidirectional video image storage apparatus 13 in such a form that a predetermined image processing and storage application is started up on a single computer system or a plurality of computer systems.

Figure 7:
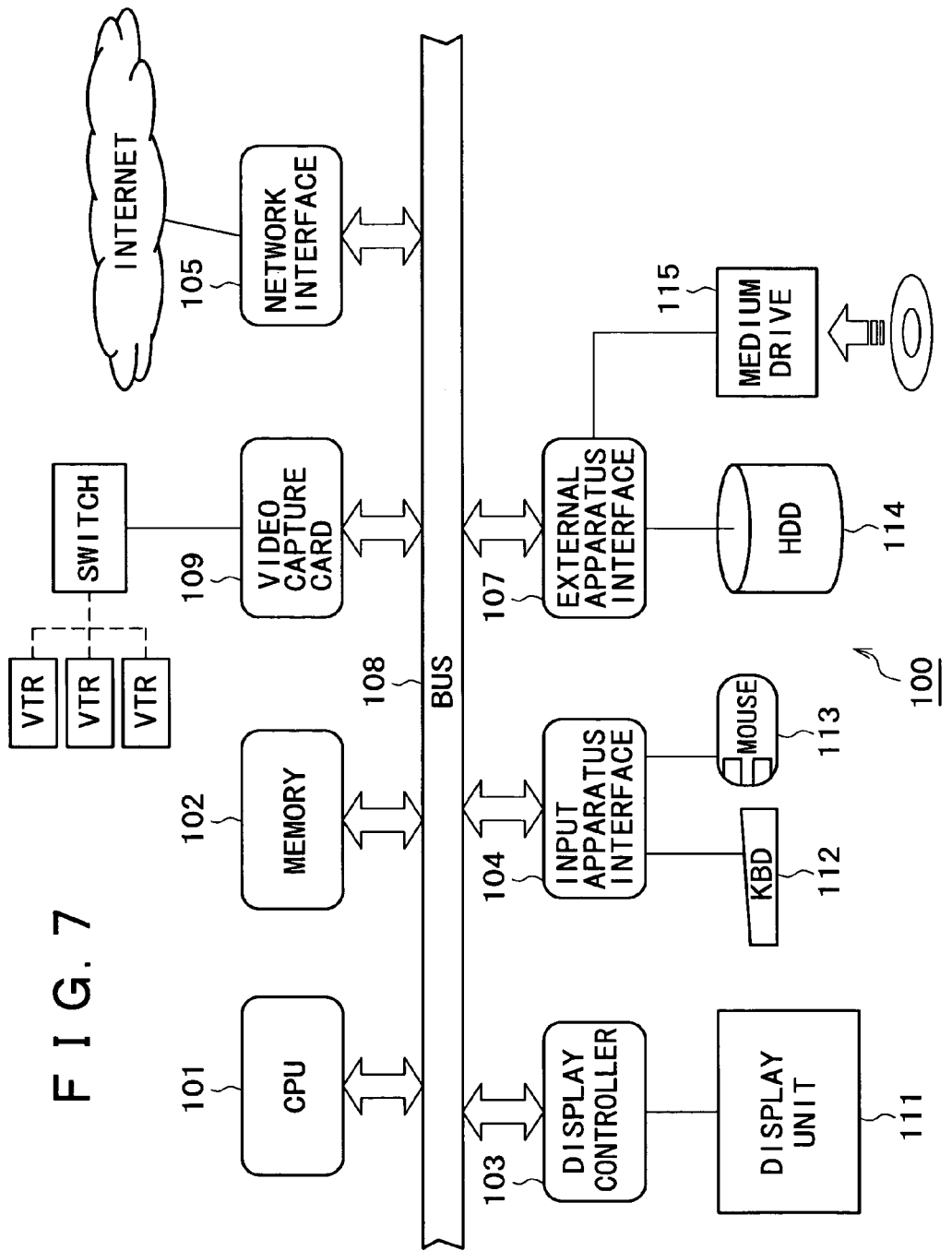
FIG. 7 is a view schematically showing a configuration of a computer system 100 applied as the omnidirectional video image synthesis apparatus 12 and an omnidirectional video image storage apparatus 13.

FIG. 7 schematically shows a configuration of the computer system 100 applied as the omnidirectional video image synthesis apparatus 12 and the omnidirectional video image storage apparatus 13. In the following, the computer system 100 is described with reference to FIG. 7.

A CPU (Central Processing Unit) 101 which is a main controller of the computer system 100 executes various applications under the control of an operating system (OS). The CPU 101 can perform, for example, a non-planar image processing application for converting a three-dimensional image drawn on a spherical surface or a cylindrical surface into a two-dimensional planar image and compressing and storing the two-dimensional planar image after the conversion. As seen in FIG. 7, the CPU 101 is interconnected to other apparatus (hereinafter described) by a bus 108.

A memory 102 is a storage device used to store program codes to be executed by the CPU 101 and temporarily store work data during such execution. It should be understood that the memory 102 shown in FIG. 7 includes both of a nonvolatile memory such as a ROM and a volatile memory such as a DRAM.

A display controller 103 is a controller for exclusive use for actual processing of a plotting instruction issued from the CPU 101. Plotting data processed by the display controller 103 is written into, for example, a frame buffer (not shown) once and then outputted on a screen by a display unit 111.

An input apparatus interface 104 is an apparatus for connecting user inputting apparatus such as a keyboard (KBD) 112 and a mouse 113 to the computer system 100.

A network interface 105 can connect the system 100 to a local network such as a LAN (Local Area Network) and further to a wide area network such as the Internet in accordance with a predetermined communication protocol such as the Ethernet.

On the network, a plurality of host terminals (not shown) are connected in a transparent state to construct a distributed computing environment. On the network, a software program, data contents and so forth can be distributed. For example, a non-planar image processing application for converting a three-dimensional image drawn on a spherical surface or a cylindrical surface into a two-dimensional planar image and compressing and storing the two-dimensional planar image after the conversion can be downloaded through the network. Also it is possible to distribute the image data compressed by the non-planar image processing application through the network.

An external apparatus interface 107 is an apparatus for connecting an external apparatus such as a hard disk drive (HDD) 114 or a medium drive 115 to the system 100.

The HDD 114 is an external storage apparatus (well known in the art) in which a magnetic disk as a storage carrier is incorporated fixedly, and is superior in the storage capacity, transfer rate and so forth to the other external storage apparatus. To place a software program onto the HDD 114 in an executable state is called "install" of the program into the system. Generally, program codes of an operating system to be executed by the CPU 101, application programs, device drivers and so forth are stored in a nonvolatile fashion on the HDD 114.

For example, a non-planar image processing application for converting a three-dimensional image drawn on a spherical surface or a cylindrical surface into a two-dimensional planar image and compressing and storing the two-dimensional planar image after the conversion can be installed into the HDD 114. Also it is possible to store a three-dimensional non-planar image which is a processing object of the non-planar image processing application, an image obtained by conversion into a two-dimensional plane, compression image data of the image and so forth on the HDD 114.

The medium drive 115 is an apparatus for being loaded with a portable medium such as a CD (Compact Disc), an MO (Magneto-Optical disc) or a DVD (Digital Versatile Disc) and accessing a data recording surface of the portable medium.

The portable medium is used principally in order to back up a software program, a data file or the like as data of the computer-readable type and move such data between different systems (the movement includes sales, circulation and distribution). For example, a non-planar image processing application for converting a three-dimensional image drawn on a spherical surface or a cylindrical surface into a two-dimensional planar image and compressing and storing the two-dimensional planar image after the conversion can be physically circulated or distributed between a plurality of apparatus by making use of the portable media. Further, a three-dimensional non-planar image which is a processing object of the non-planar image processing application, an image obtained by conversion into a two-dimensional plane, compression image data of the image and so forth can be circulated or distributed physically between a plurality of apparatus by making use of the portable media.

A video capture card 109 is an apparatus for fetching input signals from the omnidirectional image pickup apparatus 11, that is, video image signals reproduced from the VTRs connected through the switch, as computer data (a bit map file) into the computer.

It is to be noted that an example of such a computer system 100 as shown in FIG. 7 is a compatible machine or a succeeding machine of the personal computer "PC/AT (Personal Computer/Advanced Technology)" of the IBM of the United States. Naturally, another computer having another architecture can be applied as the computer system 100 according to the present embodiment.

A-4. Mapping of an Image of a Three-Dimensional Coordinate System to a Two-Dimensional Plane As described already, the omnidirectional video image production system 10 according to the present embodiment is a system which handles an omnidirectional video image picked up, for example, by such an omnidirectional image pickup apparatus 11 as shown in FIG. 2. An omnidirectional video image of the type mentioned originally is a non-planar three-dimensional image mapped on a spherical surface or a cylinder on a polar coordinate system and is not suitably handled in an existing compression format which premises handling of a two-dimensional image. In other words, in order to perform such processes as compression, storage and transfer of data, it is necessary to map an omnidirectional image represented on a non-planar surface of a three-dimensional coordinate system such as a spherical surface or a cylindrical surface to a two-dimensional planar image.

While several methods of mapping an image of a three-dimensional coordinate system to a two-dimensional planar image are available, preferably an optimum mapping method is selected in accordance with the conditions given below.

(1) In order to expand a spherical surface to a plane, it is necessary to extend some portions of the surface of the spherical surface or form ruptures at some portions of the surface of the spherical surface. In other words, it is impossible to expand a spherical shape as it is on a plane, and an error occurs without fail. Preferably, a method is used by which projection from a spherical surface to a plane is used while minimizing errors. Preferably, when a spherical surface is mapped to a plane, the amounts of information included in individual pixels are kept equal in omnidirections, that is, the individual pixels appear with an equal area in omnidirections.

(2) In an omnidirectional video image display system (hereinafter described) for displaying or reproducing an omnidirectional video image, where an omnidirectional video image storage apparatus and an arbitrary viewpoint direction video image synthesis apparatus are connected to each other by a network or even if the omnidirectional video image storage apparatus is a recording medium such as a DVD, there is a limitation to the transfer rate. Where the transfer rate is limited, also the compression rate is limited accordingly, and therefore, preferably the redundancy is low. Further, it is desired that an image can be compressed readily (for example, the spatial and/or temporal correlation is high) using a standard compression method (for example, the MPEG-2).

(3) Where it is taken into consideration that an omnidirectional video image display system requires real time processing and besides there is the possibility that there may be a limitation to the processing performance or the resources of the omnidirectional video image display system, preferably the arithmetic operation process for conversion from a spherical surface into a plane is simple.

(4) Depending upon the compression format such as the MPEG-2, there is a limitation to the resolution. Further, in an omnidirectional video image display system, where an arbitrary viewpoint direction video image is synthesized in a unit of a region (hereinafter described) not an arbitrary viewpoint direction video image but an omnidirectional video image is sometimes transferred to a texture buffer which temporarily stores a video image to be transferred to a video image display apparatus, and the texture buffer sometimes has some limitation. Where there is a limitation to the resolution in this manner, conversion into a two-dimensional image must be performed so as to satisfy the limitation.

Here, particular examples of a method of mapping an image of a three-dimensional coordinate system such as a spherical surface or a cylinder to a two-dimensional planar image.

A-4-1. Mapping Method of a Spherical Omnidirectional Video Image to a Two-Dimensional Plane As a method of mapping a spherical surface to a plane, a map projection method wherein the globe is projected on a world map on a plane is well known in the art. Where a popular map projection method is used to expand a spherical omnidirectional video image onto a plane, a pattern analogous to plotted contents on the spherical surface is projected on the plane, and therefore, there is an advantage that a human being can readily grasp an entire image of the original omnidirectional image from the mapped two-dimensional planar image.

Figure 8:
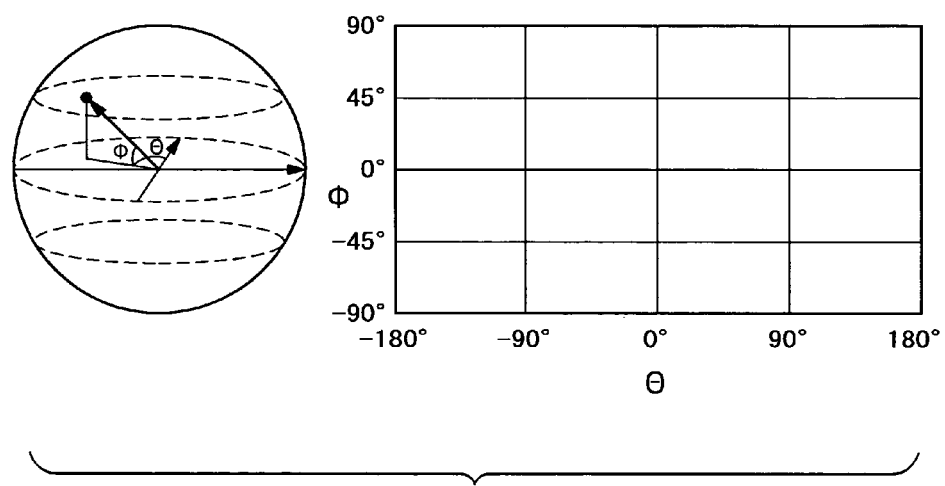
FIG. 8 is a view illustrating an example of a method of mapping an image of a three-dimensional coordinate system to a two-dimensional planar image and more particularly is a view illustrating a method of projecting a spherical surface to a cylinder and expanding the same on a plane.

For example, a method of projecting a spherical surface on a cylinder and expanding the cylinder on a plane as seen in FIG. 8 is available. In the example shown in FIG. 8, the angle of the spherical surface in the horizontal direction is allocated to the horizontal direction of the two-dimensional plane while the angle of the spherical surface in the vertical direction is allocated to the vertical direction of the two-dimensional plane individually at equal intervals. The two-dimensional image mapping information in this instance is data of the angle allocated to each of the rows and columns.

Figure 9:
FIG. 9 is a view showing an example of an image obtained by mapping an omnidirectional image picked up at a certain place outdoors to a two-dimensional plane by such a cylinder projection method as illustrated in FIG. 8.

FIG. 9 shows an example of an image obtained by mapping an omnidirectional image picked up at a certain place outdoors to a two-dimensional plane by such a cylinder projection method as illustrated in FIG. 8.

In such a mapping method as just described, since the distortion at upper and lower portions (in the case of a map, pole portions) of the mapped two-dimensional plane is greater (the density becomes lower when compared with that around the equator), the first condition described above that the amounts of information included in the individual pixels are kept equal in omnidirections cannot be satisfied. However, according to this mapping method, there is an advantage that the spatial and temporal correlation is high and a conversion expression from a spherical surface to a two-dimensional plane, that is, two-dimensional mapping information is simple. Further, as can be estimated from FIG. 9, a human being can easily grasp an entire image of the original omnidirectional image from the mapped two-dimensional planar image.

Figure 10:
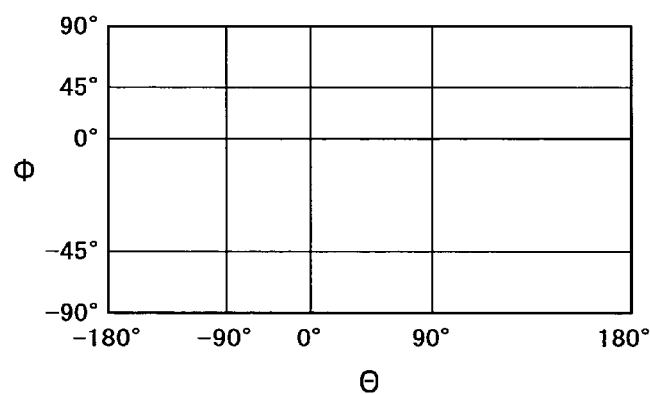
FIG. 10 is a view illustrating an example of a method of mapping an image of a three-dimensional coordinate system to a two-dimensional planar image and more particularly is a view illustrating an example which is a modification to the method illustrated in FIG. 8.

Alternatively, after a spherical surface is projected to a cylinder and expanded on a plane, not the angles in the horizontal direction and the vertical direction are allocated in an equidistantly spaced relationship to the angles in the horizontal direction and the vertical direction on the spherical surface, but the distance between the mapped angles may be changed freely as seen in FIG. 10. For example, it is possible to provide such flexibility that the density, that is, the amount of information, in a region sectioned in certain angular ranges in the horizontal direction and the vertical direction is increased. For example, a comparatively great angular range can be allocated to an image region within which detailed information is to be left from within the omnidirectional image. In this instance, the two-dimensional image mapping information is the angles allocated to each of the rows and columns similarly as described hereinabove.

Further, among the map projection methods wherein a spherical surface is projected to a cylinder and expanded on a plane, the "Sanson Flamsteed's projection" by which, with regard to any portion on the globe, the area ratio is represented correctly on a map, that is, which has a nature as an equal-area map projection, is available. Parallels are represented as horizontal lines at correct intervals with correct lengths. Meanwhile, meridians are represented as curves at equal intervals. The distortion becomes small in the proximity of the equator and the central meridian.

Figure 11:
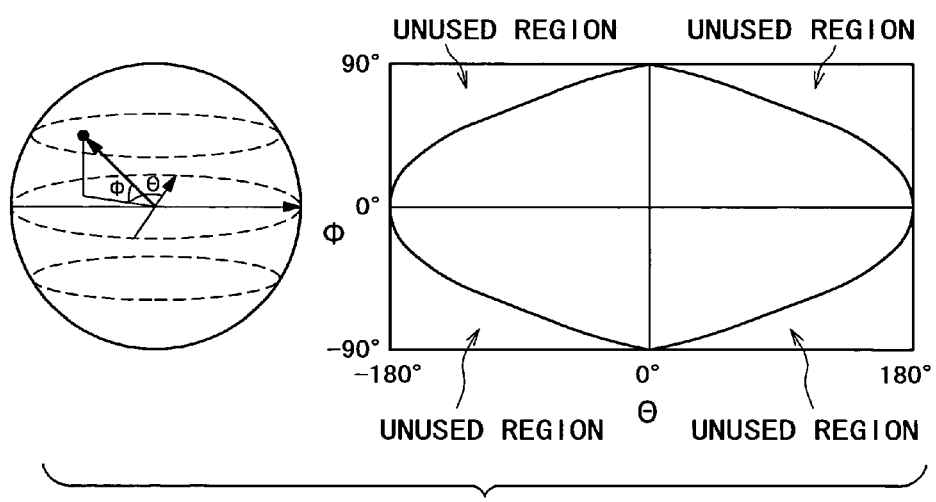
FIG. 11 is a view illustrating an another example of a method of mapping an image of a three-dimensional coordinate system to a two-dimensional planar image by projecting a spherical surface to a cylinder and expanding the same on a plane and more particularly is a view illustrating an example of mapping by the Sanson-Flamsteed's projection.

According to the two-dimensional image mapping method to which the Sanson-Flamsteed's projection is applied, due to the equal-area feature, there are advantages that the amounts of information included in pixels are equal to each other, that the spatial and temporal correlation is high, and that a conversion expression from a spherical surface into a two-dimensional plane, that is, two-dimensional image mapping information, is simple. The two-dimensional image mapping information in this instance is formed from such a three-dimensional coordinate system to two-dimensional coordinate system conversion expression given below. (It is to be noted that the two-dimensional planar image size is W×H)

$$TX = r \times \theta \times \cos\phi$$
$$TY = r \times \phi \quad (1)$$

$$\phi = \frac{TY}{H}\pi - \frac{\pi}{2} \quad (2)$$
$$\theta = \frac{TX}{W} \cdot \frac{2\pi}{\sin(\frac{\pi}{2} + \phi)}$$

Where such an equal-area cylinder map projection as the Sanson-Flamsteed's projection (or the Mollweide's projection) is used, such unused areas of an image as shown in FIG. 11 are produced. If the same background color (pixel value) is allocated to such unused regions as seen in FIG. 12, then the spatial and temporal correlation is raised to increase the compression ratio, and consequently, the quality upon displaying or reproduction is improved.

Where such traditional map projections as described above are used to map a spherical omnidirectional video image to a two-dimensional plane, since the correlation between the original three-dimensional image and the two-dimensional planar image after the mapping can be recognized through a visual sense, there is an advantage that a human being can readily grasp an entire image of the omnidirectional image from the two-dimensional planar image. However, the principal reason why the omnidirectional video image production system 10 according to the present embodiment maps to a two-dimensional planar image is that a prescribed data format can be utilized to handle an omnidirectional video image in image compression and so forth. In other words, whether or not a two-dimensional planar image can be recognized by a human being when the human being observes it is of secondary importance, and from a point of view of improvement in picture quality or handling of data on the video image display system side, it is more preferable that, when a spherical surface is mapped to a plane, the amount of information included in pixels are kept equal in omnidirections, that is, the pixels are handled in an equal area in omnidirections.

The inventors propose a technique that, in order to map a spherical surface to a two-dimensional plane so that the amounts of information included in pixels are kept equal in omnidirections, sample points are extracted uniformly from a spherical surface based on a mathematical technique and mapped to a two-dimensional planar image. In such an instance, a corresponding relationship between three-dimensional coordinates of the points sampled from the spherical surface and the two-dimensional image of the destination of the mapping makes two-dimensional image mapping information.

For example, there is a geometrical theorem that, "when the z axis of a sphere is cut with parallel planes at equal intervals, the areas on the spherical surface defined by adjacent ones of the planes are constant". For example, if a sphere having a radius r is cut into round slices at equal intervals h with parallel planes perpendicular to the Z axis, then the area on each of the divisional spherical surface portions is $2\pi rh$ and becomes constant (for details, refer to Joseph O'Rourke, "ComputationaliGeometry Column 31").

Where the Z axis is [−1 . . . 1] and the size of the two-dimensional planar image is W×H, if h is [0 . . . H], then the angle (latitude) $\Phi_h$ corresponding to the height h in the Z axis direction is represented by the following expression:

$$\Phi_h = \arcsin\left(\frac{2h - H}{H}\right) \quad (3)$$

Here, pairs of ($\Phi$, $\Theta$) are successively determined using uniform random numbers with which $\Phi$ is included in $[\Phi_{h-1} \ldots \Phi_h]$ and $\Theta$ is included in $[0 \ldots 2\pi]$. The contents of the pairs are placed into two-dimensional image mapping information and a two-dimensional image is produced. In particular, regions on the spherical surface sectioned at equal intervals, that is, with a range $[\Phi_{h-1} \ldots \Phi_h]$ of an equal area, in the Z axis direction in the three-dimensional polar coordinate system are expanded randomly to belt-like planar regions sectioned at equal intervals, that is, with equal areas, within the range of $[\Phi_{h-1} \ldots \Phi_h]$ on the two-dimensional coordinate system (refer to FIG. 13). The inventors of the present invention refer to the just described two-dimensional image mapping method as "Stratified Random".

As seen in FIG. 14, for example, $\Phi_{i,j}$ which satisfies $\Phi_{i-1} < \Phi_{i,j} < \Phi_{i+1}$ at a point (i, j) on the two-dimensional plane is determined randomly. Then, a point of a point $(\Theta_{i,j}, \Phi_{i,j})$ extracted randomly on the spherical surface through sorting of the $\Theta$ values is plotted at a point (i, j) on the two-dimensional plane. It is to be noted, however, that $\Theta_{i,j}$ is determined randomly within the range of $[0 \ldots 2\pi]$ while $\Phi_{i,j}$ is determined randomly within the range of $[\Phi_{i-2} \ldots \Phi_{i+1}]$. All $(\Theta_{i,j}, \Phi_{i,j})$ are sorted in a dictionary fashion for each row i of the two-dimensional plane, and this makes two-dimensional image mapping information in this instance.

Figure 15:
FIG. 15 is a view showing an example of an image obtained by mapping an omnidirectional image picked up at a certain place outdoors to a two-dimensional plane by a mapping method based on the Stratified Random.

FIG. 15 shows an example of an image obtained by mapping an omnidirectional image picked up at a certain place outdoors to a two-dimensional plane by a mapping method based on the Stratified Random. The omnidirectional image on which FIG. 15 is based is the same as that used in FIG. 9. As can be seen also from FIG. 15, since the mapping method based on the Stratified Random maps regions on a spherical surface divided at equal intervals in the Z axis direction randomly in corresponding regions on a two-dimensional plane, the entire image cannot be grasped readily through visual observation when compared with that of FIG. 9.

One of advantages of the two-dimensional image mapping method based on the Stratified Random is that pixels can be sampled uniformly from a spherical surface.

On the other hand, the two-dimensional image mapping method based on the Stratified Random has (two) drawbacks that somewhat greater amount of calculation processing is required and that an entire image of an original omnidirectional image cannot be grasped readily from an image mapped to a two-dimensional plane (refer to FIG. 15). Further, since the two-dimensional image mapping information is described in a unit of a pixel, the two-dimensional image mapping method based on the Stratified Random cannot be used for a system wherein display or reproduction of an omnidirectional video image is performed for each region. Furthermore, since an omnidirectional video image is mapped to pixels at random places, when the omnidirectional video image is displayed or reproduced from the two-dimensional image, in order to interpolate the pixel value at the point $(\Theta, \Phi)$, adjacent pixels must be searched out efficiently.

According to the mapping method to a two-dimensional plane based on the Stratified Random described above, random numbers are used to map a non-planar image represented by a three-dimensional coordinate system to a two-dimensional planar image such that the amount of information included in pixels are kept equal in omnidirections, that is, the pixels are handled with an equal area in omnidirections. In this instance, the uniformity of the amount of information of the pixels premises that the uniformity of random numbers to be produced is secured. However, it is technically difficult to produce uniform random numbers.

On the other hand, in the field of the mathematics, a theorem called "Hammersley" which makes it possible to extract a large number of points from the surface of a square or a sphere while the uniformity in density is maintained. According to the Hammersley Sequence which applies the Hammersley, sample points can be successively extracted from a spherical surface while the uniformity of density is maintained (refer to, for example, a paper by Tien-Tsin Wong, Wai-Shing Luk, and Pheng-Ann Heng, "Sampling with Hammersley and Halton Points").

Figure 16:
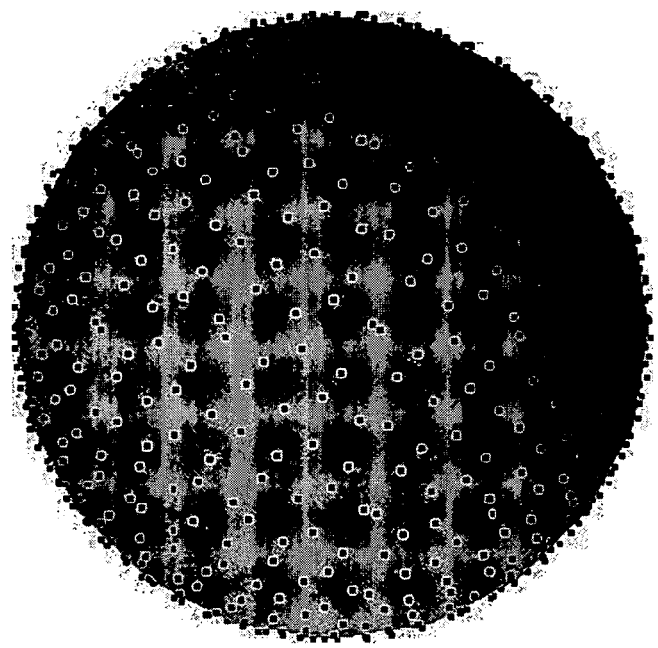
FIG. 16 is a view illustrating a manner wherein 1,000 sample points are extracted from a spherical surface by a Hammersley Sequence.
Figure 17:
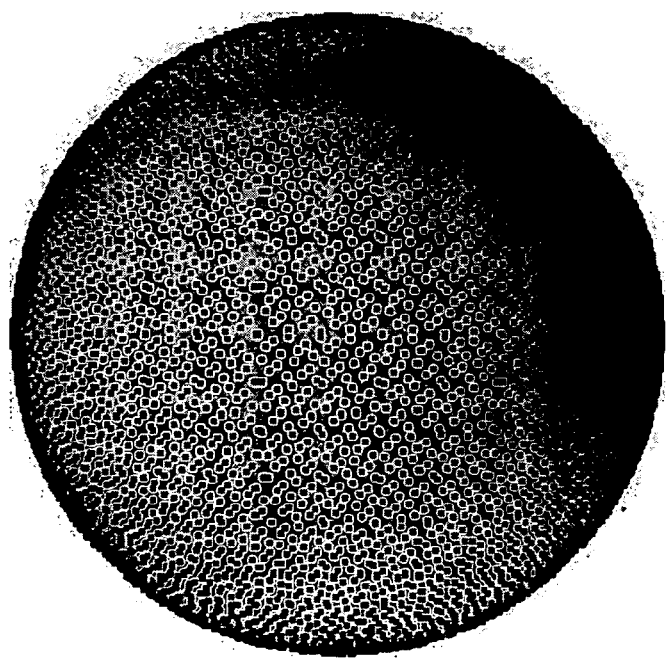
FIG. 17 is a view illustrating a manner wherein 10,000 sample points are extracted from a spherical surface by a Hammersley Sequence.

FIGS. 16 and 17 illustrate manners wherein 1,000 and 10,000 sample points are extracted from a spherical surface in accordance with the Hammersley Sequence, respectively.

Further, for comparison, FIGS. 18 and 19 illustrate manners wherein 1,000 and 10,000 sample points are extracted from a spherical surface using random numbers obtained by ordinary random number calculation, respectively. As can be seen comparison between the figures, where sample points are extracted using the Hammersley Sequence, points are extracted from a spherical surface while the uniformity in density is kept better than where sample points are extracted using random numbers, and accordingly, it could be understood that the amounts of information included in the pixels, from a non-planar image represented by a three-dimensional coordinate system, in omnidirections are kept equal.

Thus, the inventors of the present invention propose, as another example wherein sample points are extracted uniformly from a spherical surface based on a mathematical technique and are mapped to a two-dimensional planar image, a mapping method which uses the Hammersley Sequence described below.

Figure 20:
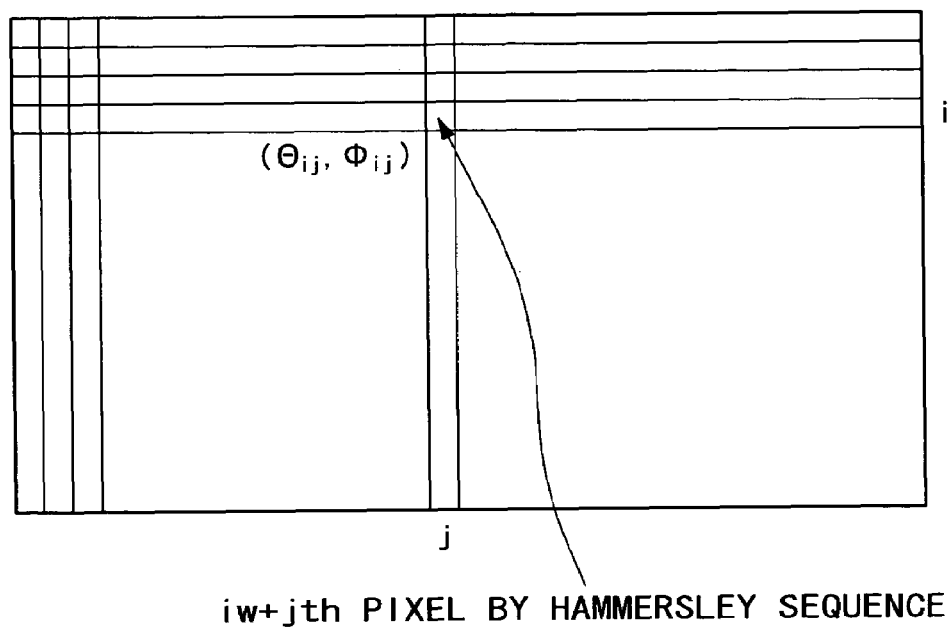
FIG. 20 is a view illustrating a manner wherein an omnidirectional image is mapped to a two-dimensional planar image using the Hammersley Sequence.

According to the present method, a sample point on a spherical surface to be mapped to a point at the ith row of the jth column of a two-dimensional planar image of the destination of mapping is extracted using the Hammersley Sequence. For example, where one row of the two-dimensional image includes w pixels, the iw+jth sample point on the original spherical surface is extracted using the Hammersley Sequence and mapped to a point $(\Theta_{i,j}, \Phi_{i,j})$ on the two-dimensional plane (refer to FIG. 20).

Here, a procedure for extracting the iw+jth sample point from the spherical surface using the Hammersley Sequence is described.

First, k is placed to k=iw+j, and this k is represented by the following recurrence formula using the base p:

$$k = a_0 + a_1 p + a_2 p^2 + \ldots + a_r p^r \qquad (4)$$

Further, a function $\Psi_p(k)$ which includes k as a variable is defined as given below:

$$\Psi_p(k) = \frac{a_0}{p} + \frac{a_1}{p^2} + \cdots + \frac{a_r}{p^{r+1}} \qquad (5)$$

Here, the following coordinate values (X, Y, Z) represented by variables $\phi$ and t by replacing $(k/m, \Psi_p(k)) = (\phi, t)$ represent a sample point determined using the Hammersley Sequence.

$$\begin{pmatrix} \sqrt{1-t^2} \cos\psi \\ \sqrt{1-t^2} \sin\psi \\ t \end{pmatrix} = \begin{pmatrix} X \\ Y \\ Z \end{pmatrix} \qquad (6)$$

In this instance, a corresponding relationship to the three-dimensional coordinate system $(\Theta, \Phi)$ on the original spherical surface, that is, the mapping information, is described as given by the following expression:

$$\begin{pmatrix} \Theta \\ \Phi \end{pmatrix} = \begin{pmatrix} \tan^{-1}\left(\frac{X}{Z}\right) \\ \sin^{-1}\frac{Y}{\sqrt{X^2+Y^2+Z^2}} \end{pmatrix} \qquad (7)$$

Figure 21:
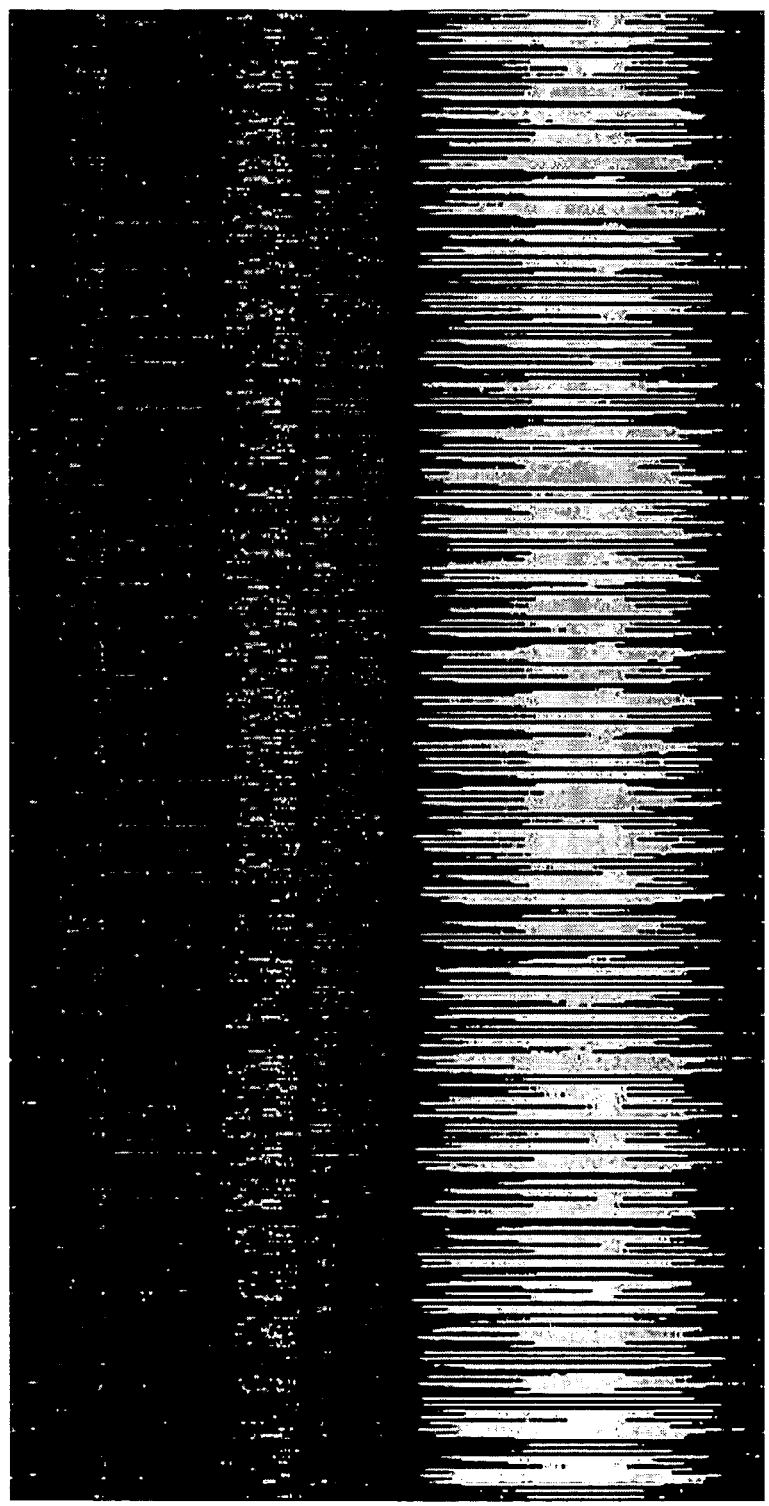
FIG. 21 is a view showing an example of an image obtained by mapping an omnidirectional image picked up at a certain place outdoors to a two-dimensional plane by a mapping method based on the Hammersley Sequence.

FIG. 21 shows an example of an image obtained by mapping an omnidirectional image picked up at a certain place outdoors to a two-dimensional plane by a mapping method based on the Hammersley Sequence. While the omnidirectional image on which FIG. 21 is based is the same as that used in the case of FIG. 9, since the mapping method based on the Hammersley Sequence maps sample points successively calculated with the Hammersley Sequence randomly in a pertaining region on the two-dimensional plane, it is difficult to grasp the entire image of the omnidirectional image through visual observation when compared with FIG. 9.

One of advantages of the two-dimensional image mapping method based on the Hammersley Sequence is that pixels can be sampled uniformly from a spherical surface.

On the other hand, the two-dimensional image mapping method based on the Hammersley Sequence has (two) drawbacks that somewhat greater amount of calculation processing is required and that an entire image of an original omnidirectional image cannot be grasped readily from an image mapped to a two-dimensional plane (refer to FIG. 21). Further, since the two-dimensional image mapping information is described in a unit of a pixel, the two-dimensional image mapping method based on the Hammersley Sequence cannot be used for a system wherein display or reproduction of an omnidirectional video image is performed for each region. Furthermore, since adjacent pixels are not necessarily mapped in an adjacent relationship by the Hammersley Sequence, when the omnidirectional video image is displayed or reproduced from the two-dimensional image, in order to interpolate the pixel value at the point $(\Theta, \Phi)$, adjacent pixels must be searched out efficiently.

A-4-2. Mapping Method of a Cylindrical Omnidirectional Video Image to a Two-Dimensional Plane Where the omnidirectional video image is of the cylindrical type, if the cylinder is cut vertically and opened, then it becomes a rectangle as it is as seen in FIG. 22. While, in the example of FIG. 22, ±45° is allocated upwardly and downwardly to the vertical axis, the value is optional. Similarly as in the description given hereinabove with reference to FIG. 10, also it is possible to increase the density in a particular region in a concentrated manner to increase the picture quality.

It is to be noted, however, that, where the omnidirectional video image is of the cylindrical type, it sometimes occurs that the aspect ratio when it is expanded to a rectangle is different extremely, that is, the magnitude in the horizontal direction is greater than the magnitude in the vertical direction. Since an image of the type just described does not match with the prescribed size of the compression format such as the MPEG, for example, divisional pieces obtained by equally dividing the rectangular image are disposed in order from above so as to satisfy the prescribed format size. In the example shown in FIG. 23, the rectangular image expanded from the cylindrical image is divided into two halves, and the right half is patched to the bottom of the left half to adjust the aspect ratio.

A-5. Two-Dimensional Image Mapping Information

As described hereinabove, the mapping information production section 25 produces a corresponding relationship between coordinates (TX, TY) of a planar image and three-dimensional polar coordinates $(\Theta, \Phi, r)$ as two-dimensional mapping information. Further, the omnidirectional video image data format conversion section add the two-dimensional mapping information if necessary to the video image information. However, according to a system that performs mapping not in a unit of a pixel but in a unit of a region, coordinates only of each primitive apex may have two-dimensional mapping information.

Where the two-dimensional mapping information is added to the video image information, the necessity for conversion of (TX, TY)→$(\Theta, \Phi)$ is eliminated, and consequently, the burden on an omnidirectional video image display system (hereinafter described) decreases. Also the degree of freedom in mapping from a three-dimensional image to a two-dimensional image increases. For example, even where such a simple format as shown in FIG. 8 is used, it is possible to increase the density at a polar portion or raise the density at a particular place.

Further, by utilization of mapping information, the degree of freedom in utilization of an omnidirectional video image as a three-dimensional object or a space in an omnidirectional video image display apparatus increases. For example, it is possible for an arbitrary viewpoint direction video image synthesis apparatus of an omnidirectional video image display apparatus to regenerate an arbitrary three-dimensional shape using distance information included in the mapping information. For example, if the distance 1 is added to all pixels, then a sphere of a radius 1 is obtained, and if arbitrary r is allocated, then an arbitrary shape can be regenerated. Through this, production or utilization of a three-dimensional GUI (Graphical User Interface) which has not conventionally been available can be achieved. Details of the omnidirectional video image display apparatus are hereinafter described.

The two-dimensional mapping information differs depending upon the mapping method to a two-dimensional plane adopted by the mapping section 23. The mapping information in the different mapping methods is described hereinabove.

B. Omnidirectional Video Image Display System

Subsequently, an omnidirectional video image display system for displaying a non-planar image of a three-dimensional coordinate system obtained by mapping to a two-dimensional planar image in accordance with such processes as described in the preceding item A as a video image is described.

B-1. System Configuration

Figure 24:
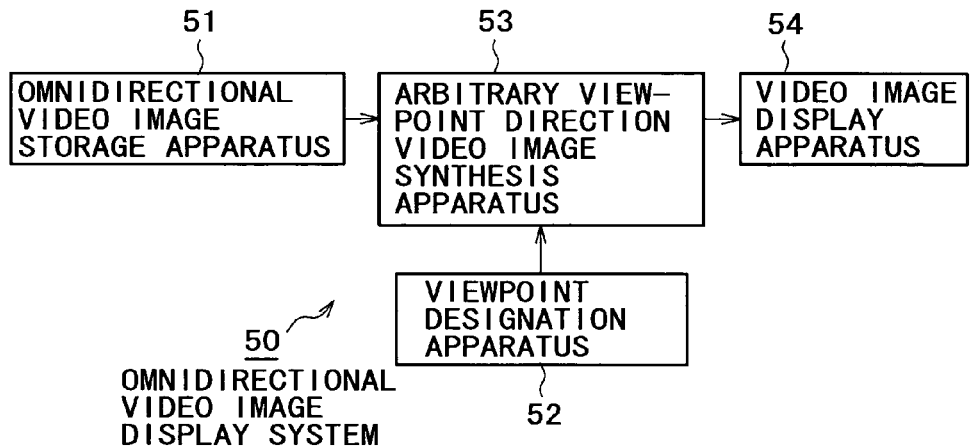
FIG. 24 is a view schematically showing a configuration of an omnidirectional video image display system 50 used to carry out the present invention.

FIG. 24 schematically shows a configuration of an omnidirectional video image display system 50 used to carry out the present invention. As shown in FIG. 24, the omnidirectional video image display system 50 includes an omnidirectional video image storage apparatus 51, a viewpoint designation apparatus 52, an arbitrary viewpoint direction video image synthesis apparatus 53 and a video image display apparatus 54. Although the omnidirectional video image display system 50 can be designed as a hardware apparatus for exclusive use, it is otherwise possible to implement the same in such a form that a predetermined image processing application is started up, for example, on such an ordinary computer system 100 as shown in FIG. 7.

The omnidirectional video image storage apparatus 51 can be formed using an external storage apparatus of an ordinary computer system such as a hard disk or a DVD (Digital Versatile Disc).

The viewpoint designation apparatus 52 is an apparatus which accepts, as an input thereto, information of an omnidirectional video image such as an angular direction, a zoom, a parallel movement and so forth with which the user wants to watch the omnidirectional video image and is formed from general user inputting apparatus such as, for example, a mouse, a keyboard and a game controller. The input data inputted through the viewpoint designation apparatus 52 is supplied to the arbitrary viewpoint direction video image synthesis apparatus 53.

The arbitrary viewpoint direction video image synthesis apparatus 53 is an apparatus which produces a video image desired by the user and includes at least a CPU (Central Processing Unit) and a GPU (Graphic Processing Unit). A video image produced by the arbitrary viewpoint direction video image synthesis apparatus 53 is a viewpoint direction video image when the outside is viewed from the inside of a three-dimensional object (sphere, cylinder or the like) or a three-dimensional shape video image when a three-dimensional object is viewed from the outside.

The video image display apparatus 54 is formed from a general display apparatus such as a television set or a PC monitor and displays and outputs a video image transferred thereto from the arbitrary viewpoint direction video image synthesis apparatus 53.

Figure 25:
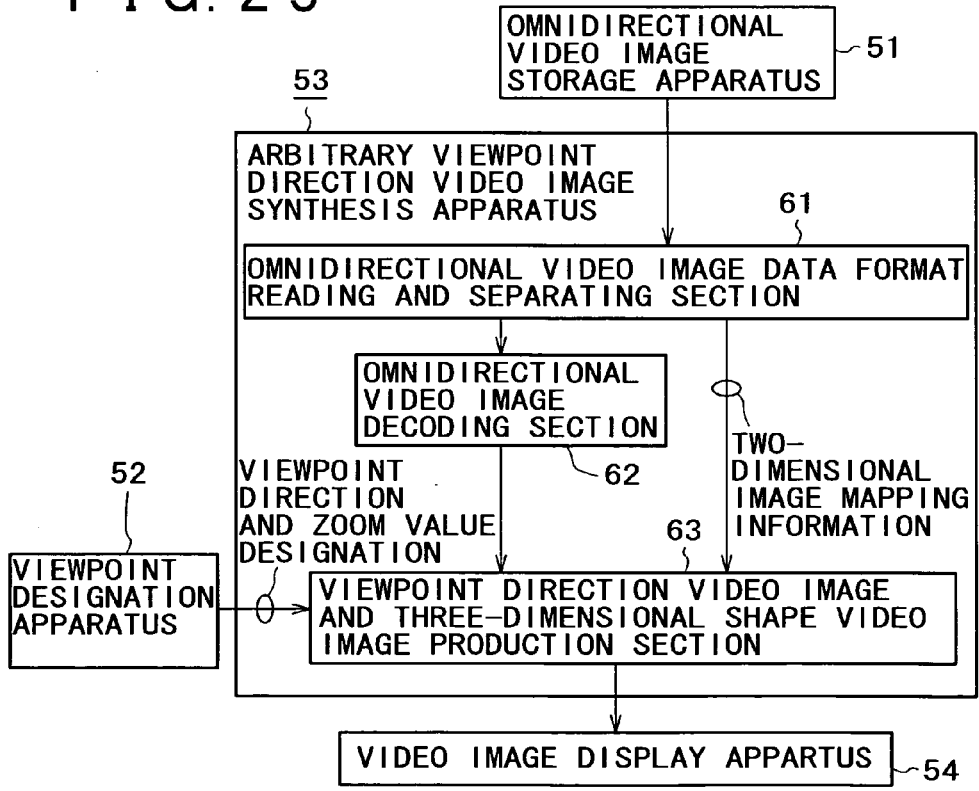
FIG. 25 is a view schematically showing a functional configuration of an arbitrary viewpoint direction video image synthesis apparatus 53.

FIG. 25 schematically shows a functional configuration of the arbitrary viewpoint direction video image synthesis apparatus 53. As shown in FIG. 25, the arbitrary viewpoint direction video image synthesis apparatus 53 includes an omnidirectional video image data format reading and separating section 61, an omnidirectional video image decoding section 62, and a viewpoint direction video image and three-dimensional shape video image production section 63.

The omnidirectional video image data format reading and separating section 61 reads omnidirectional video image data having such a data format as shown in FIG. 6 from the omnidirectional video image storage apparatus 51 and separates the omnidirectional video image data into omnidirectional video image information and two-dimensional image mapping information.

The omnidirectional video image decoding section 62 performs a decoding process for the omnidirectional video image information coded, for example, in the MPEG format or the like.

The viewpoint direction video image and three-dimensional shape video image production section 63 produces a three-dimensional shape image in accordance with a viewpoint direction and a zoom value designated from the user through the viewpoint designation apparatus 52 using the decoded omnidirectional video image and the two-dimensional image mapping information. The produced three-dimensional shape video image is transferred to the video image display apparatus 54, by which it is displayed and outputted.

B-2. Reproduction of an Omnidirectional Video Image in Accordance with a Viewpoint Direction Here, a process for reproducing a three-dimensional shape video image in an arbitrary viewpoint direction from an omnidirectional video image mapped to a two-dimensional planar image is described.

Systems for mapping a spherical or cylindrical omnidirectional video image to a two-dimensional planar image are roughly divided into a "pixel system" wherein mapping is performed in a unit of a pixel and a "region system" wherein mapping is performed in a unit of a region. Whichever system is used, re-mapping from an omnidirectional video image mapped on a two-dimensional plane to a two-dimensional display screen of the video image display apparatus 54 is performed.

B-2-1. Pixel System

Figure 26:
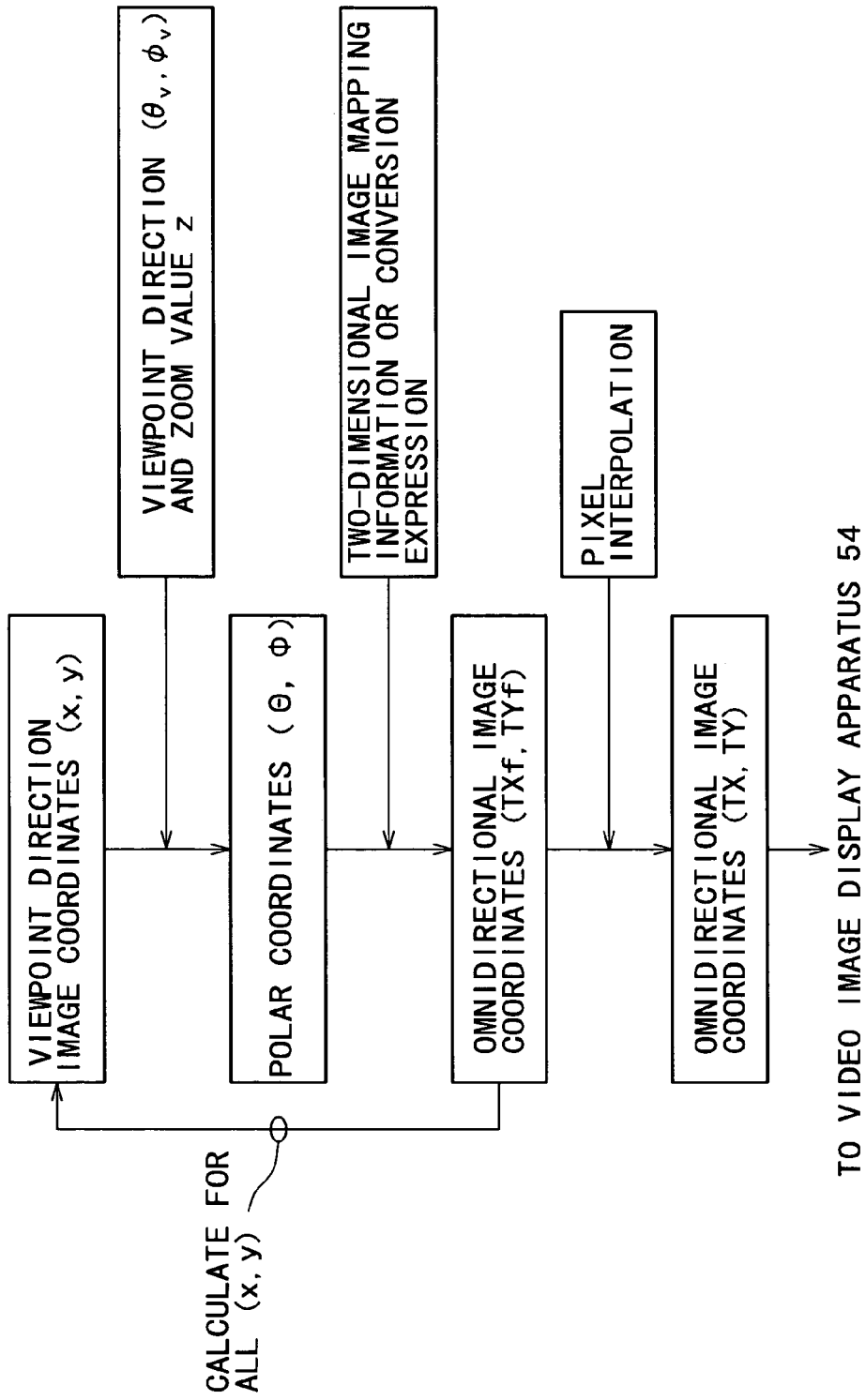
FIG. 26 is a view schematically illustrating flows of data for reproducing a three-dimensional shape video image in an arbitrary viewpoint direction where a pixel system is adopted for mapping of an omnidirectional video image to a two-dimensional plane.

FIG. 26 schematically shows flows of data for reproducing a three-dimensional shape video image in an arbitrary viewpoint direction where the pixel system is adopted for mapping of an omnidirectional video image to a two-dimensional plane. In this instance, each pixel of the viewpoint direction video image is determined by calculation from the omnidirectional video image using an input (a viewpoint direction and a designated zoom value) from the viewpoint designation apparatus 52 and two-dimensional image mapping information added to the omnidirectional video image.

First, for each pixel (x, y) of the viewpoint direction video image, polar coordinates $(\Theta, \Phi)$ are determined by calculation from the viewpoint direction $(\theta_v, \Phi_v)$ and the zoom value z passed thereto from the viewpoint designation apparatus 52 using the following expressions:

$$(X, Y, Z) = (KR)^{-1} \times (x, y, 1) \qquad (8)$$

$$\Theta = \tan^{-1}\frac{X}{Z}$$

$$\Phi = \sin^{-1}\frac{Y}{\sqrt{X^2+Y^2}+Z^2} \left(\text{for a cylinder, } \Phi = \sin^{-1}\frac{Y}{\sqrt{X^2+Z^2}}\right)$$

Here, R represents a rotation matrix and is determined from the viewpoint direction $(\theta_v, \Phi_v)$ as given by the following expression:

$$R = \begin{pmatrix} \cos\theta_v & 0 & \sin\theta_v \\ \sin\phi_v\sin\theta_v & \cos\phi_v & -\sin\phi_v\cos\theta_v \\ -\cos\phi_v\sin\theta_v & \sin\phi_v & \cos\phi_v\cos\theta_v \end{pmatrix} \qquad (9)$$

Meanwhile, K is a matrix for perspective conversion and is represented by such a 3×3 matrix as given below:

$$K = \begin{pmatrix} fx & 0 & px \\ 0 & fy & py \\ 0 & 0 & 1 \end{pmatrix} \qquad (10)$$

However, the point (px, py) is the point at the center of the image, and fx and fy are focal lengths in the x and y directions, respectively. The zoom is achieved by multiplying fx and fy by z.

Then, the two-dimensional image mapping information is referred to convert the polar coordinates $(\Theta, \Phi)$ into omnidirectional image coordinates (TXf, TYf). In this instance, where the expression used when the omnidirectional video image synthesis apparatus 12 of the omnidirectional video image production system 10 (refer to the foregoing description and FIG. 1) converts the three-dimensional coordinates into the two-dimensional image is known also to the omnidirectional video image display system 50 side, not the mapping information added to the omnidirectional video image data format but the expression may be used. Since provision of mapping information for each pixel is sometimes redundant, the availability of use of such a method as described above is high.

The omnidirectional image coordinates determined in this instance often have a floating point. Therefore, it is sometimes better to determine omnidirectional image coordinates by interpolation from an omnidirectional image which uses an integer coordinate system. As the interpolation method, closest interpolation, linear interpolation, cubic interpolation, sinc interpolation, spline interpolation and so forth can be used.

Such conversion as described above is calculated for all viewpoint direction images (x, y), and a viewpoint direction image is produced from the omnidirectional image coordinates (TX, TY) and transferred to the video image display apparatus 54.

B-2-2. Region System

Depending upon the performance of the CPU of the arbitrary viewpoint direction video image synthesis apparatus 53, the real time process cannot be performed in time where the pixel system described above is used. Thus, the amount of calculation can be significantly reduced by using the region system which uses a texture mapping function wherein a texture with which a CPU is equipped in a standard manner is patched on a screen.

Figure 27:
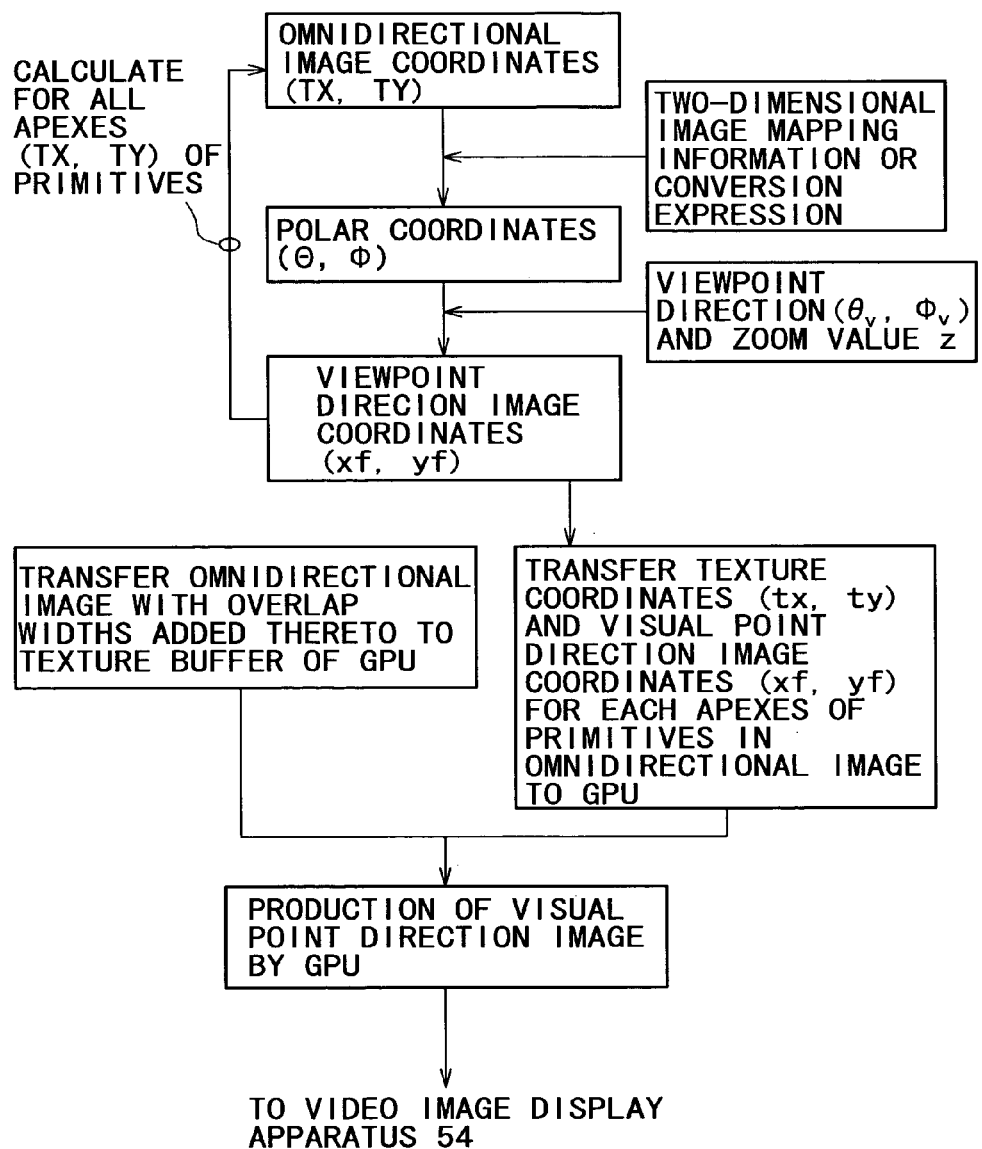
FIG. 27 is a view schematically illustrating flows of data for reproducing a three-dimensional shape video image in an arbitrary viewpoint direction where a region system is adopted for mapping of an omnidirectional video image to a two-dimensional plane.
Figure 28:
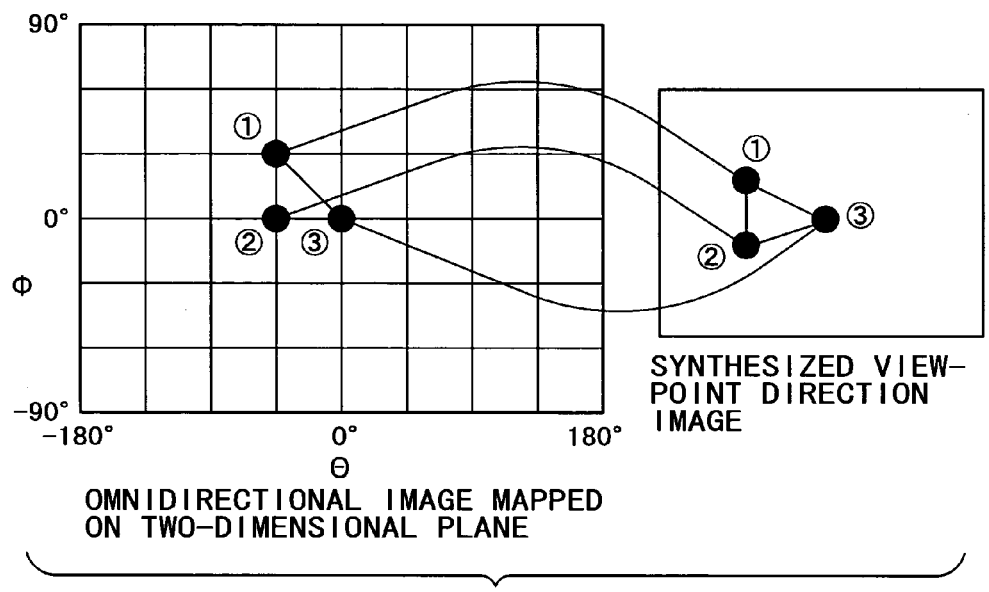
FIG. 28 is a view illustrating a concept of synthesizing arbitrary viewpoint direction video images where the region system is adopted.

FIG. 27 schematically illustrates flows of data for reproducing a three-dimensional shape video image in an arbitrary viewpoint direction where the region system is adopted for mapping of an omnidirectional video image to a two-dimensional plane. Meanwhile, FIG. 28 shows a view of a concept of synthesis of an arbitrary viewpoint direction video image where the region system is adopted.

First, mapping information included as additional information is used to convert omnidirectional image coordinates (TX, TY) of an omnidirectional video image in a unit of "primitive" with regard to each apex of the primitives into polar coordinates ($\Theta$, $\Phi$). Here, the primitive is a basic plotting factor formed from a triangle or a quadrangle, and a GPU generally performs plotting in a unit of a primitive.

Then, the polar coordinates ($\Theta$, $\Phi$) are converted into viewpoint direction image coordinates ($x_f$, $y_f$) based on the viewpoint direction ($\theta_v$, $\Phi_v$) and the zoom value z passed from the viewpoint designation apparatus 52. The conversion expression is such as given below:

$$(X, Y, Z) = (\sin \theta_v \cos \phi_v, \sin \phi_v, \cos \theta_v \cos \phi_v)$$

(for a cylinder, $(\sin \theta_v, \theta_v, \cos \theta_v)$)

$$(xf', yf', w) = K \times R \times (X, Y, Z) \quad (11)$$

$$(xf, yf) = \left(\frac{xf'}{w}, \frac{yf'}{w}\right)$$

Here, R is a rotation matrix, and K is a 3×3 matrix for perspective conversion. Refer to the expressions (7) and (8) given hereinabove.

With the expressions above, viewpoint direction image coordinates having the same coordinate values (xf, yf) at two points of (X, Y, Z) and (−X, −Y, −Z) (that is, a pair of points symmetrical with respect to a point) are determined. Therefore, in order to investigate from which one of the two points the determined viewpoint direction image coordinates (xf, yf) have been determined, the determined coordinates (xf, yf) are converted into a three-dimensional coordinate system (X', Y', Z') with the mapping information, and then it is checked whether or not (X', Y', Z') and (X, Y, Z) coincide with each other, by which the foregoing can be discriminated. Otherwise, if the value of w is positive, then it may be interpreted that the value determined with (X, Y, Z) is effective.

Then, the omnidirectional video image is transferred as a texture to the GPU (or a texture buffer in a VRAM (Video Random Access Memory) prepared in the GPU). Then, a pair of the coordinate values (tx, ty) and the viewpoint direction image coordinates (xf, yf) which correspond on the texture buffer to the omnidirectional image coordinates (TX, TY) as regards the apexes of each primitive are transferred to the GPU together with an instruction to produce a viewpoint direction image in a unit of a primitive. In this instance, an interpolation technology prepared in the GPU can be used. As the interpolation method, closest interpolation, linear interpolation, cubic interpolation sinc interpolation, spline interpolation and so forth can be used.

Here, when an interpolation process is executed, some trouble may possibly occur with the image depending upon the GPU. For example, in such a system that the width of the texture buffer is limited to 1,024 pixels in the maximum, it is necessary to equally divide a cylindrical omnidirectional video image and dispose resulting divisional pieces in order from above so as to satisfy a prescribed format size as described hereinabove with reference to FIG. 23 (in the example shown in FIG. 23, a rectangular image expanded from a cylindrical shape is divided into two halves and the right half is patched to the bottom of the left half to adjust the aspect ratio). Where a GPU equipped with a linear interpolation function like, for example, the GPU "Graphic Synthesizer" incorporated in the game machine Playstation 2 (PS2) of Sony Computer Entertainment Inc. is used, the linear interpolation function does not sometimes function well at an end edge portion of a divisional piece.

Figure 29:
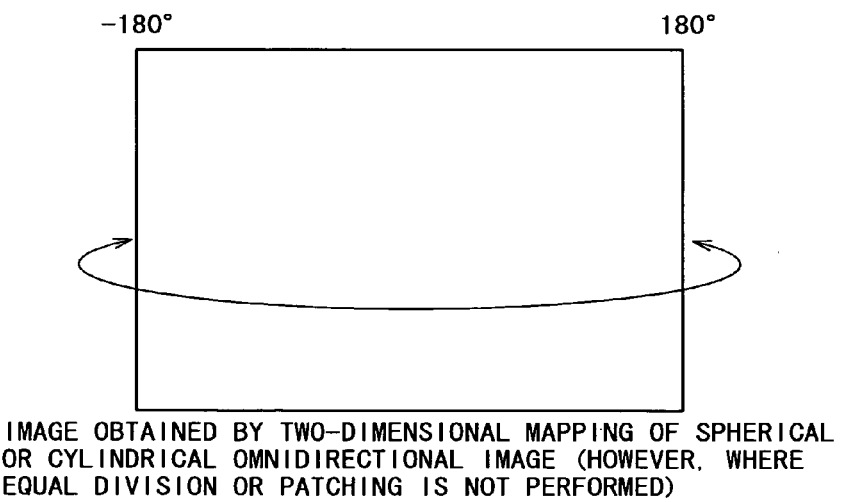
FIG. 29 is a view showing a two-dimensional omnidirectional image obtained by mapping a spherical or cylindrical omnidirectional image to a two-dimensional plane (however, where a rectangular image is not divided equally and patched)
Figure 30:
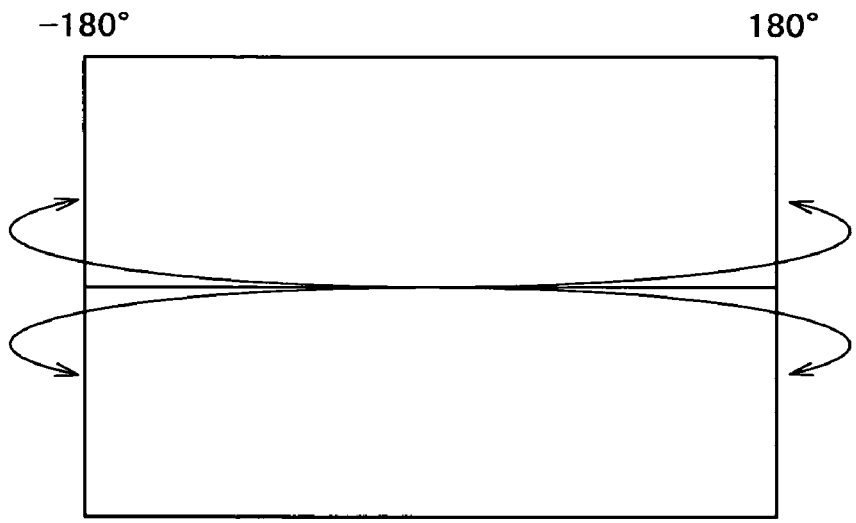
FIG. 30 is a view showing a two-dimensional omnidirectional image obtained by mapping a spherical or cylindrical omnidirectional image to a two-dimensional plane (however, where a rectangular image is divided equally and patched)

For example, when the pixel interpolation process comes to a portion in the proximity of an end edge of a rectangular image cut and expanded, pixels to be used for interpolation are positioned at a folded back place as shown in FIG. 29 or 30. However, since such a portion in the proximity of an end edge of a rectangular image as just mentioned does not have pixel data of an adjacent pixel or macro block which originally is contiguous to the portion, interpolation of a pixel value cannot be performed. Such a place as just described above sometimes appears as a surplus line on the screen of the video image display apparatus 54 as a result that no linear interpolation is performed at the place (refer to FIG. 31).

Figure 31:
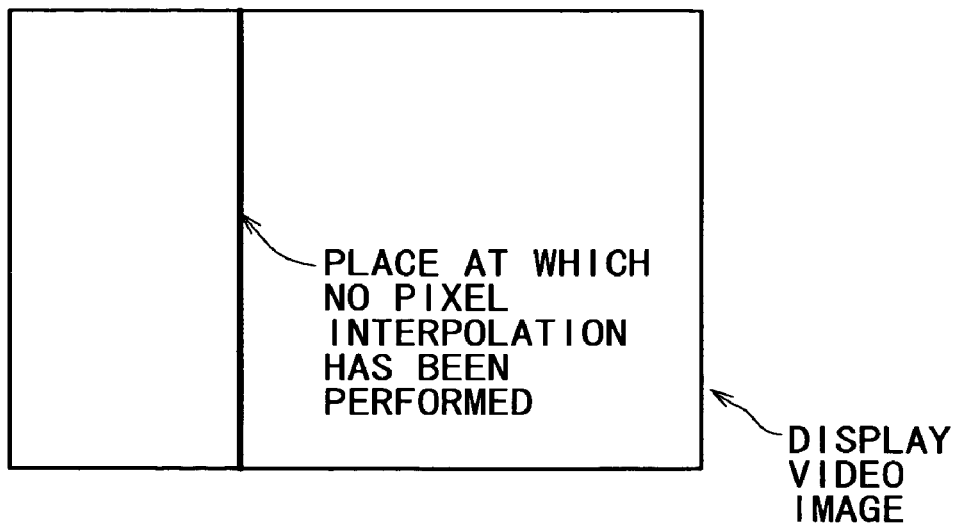
FIG. 31 is a view illustrating a manner wherein a portion for which liner interpolation has not been performed appears as a surplus line on a screen of a video image display apparatus 54.
Figure 32:
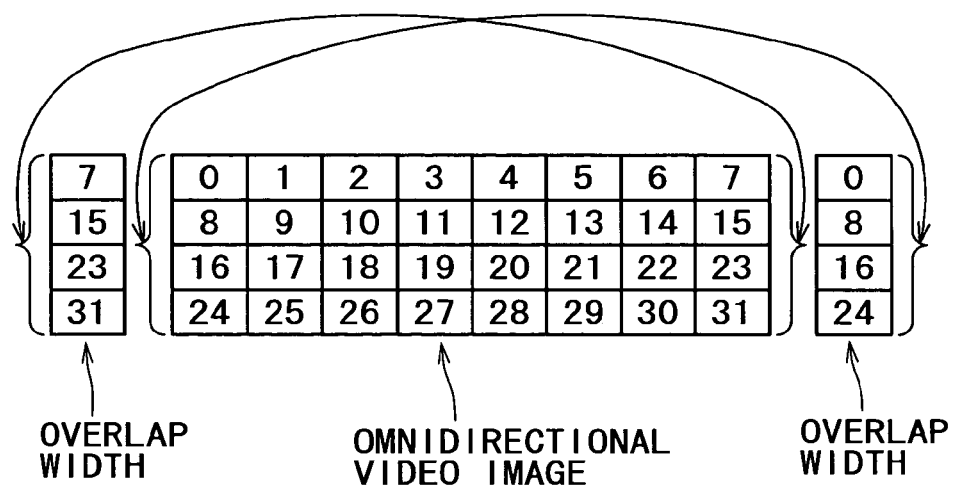
FIG. 32 is a view illustrating a manner wherein macro blocks at portions contiguous to the opposite ends each of equally divided pieces are added as overlap widths (however, where a rectangular image is not equally divided and patched)
Figure 33:
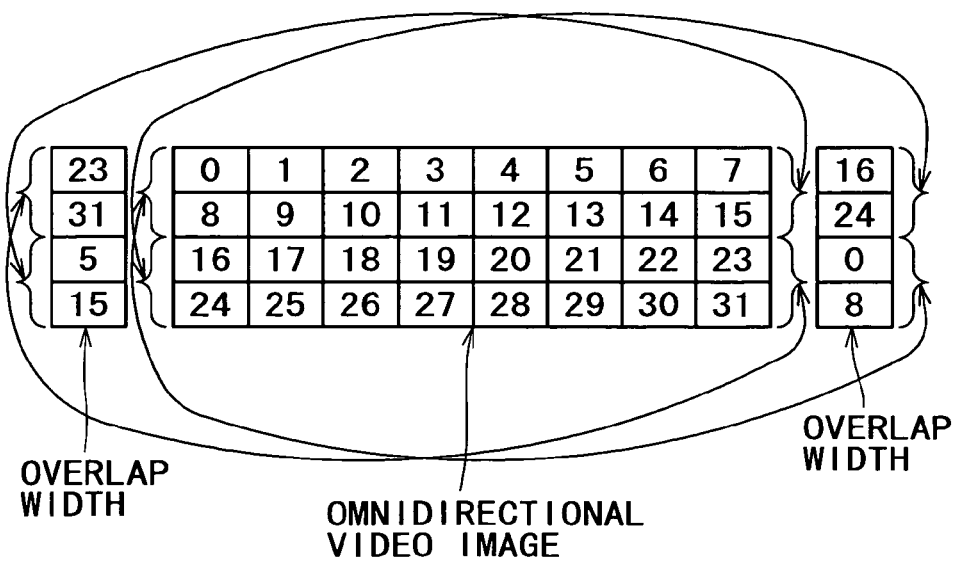
FIG. 33 is a view illustrating a manner wherein macro blocks at portions contiguous to the opposite ends of each of equally divided pieces are added as overlap widths (however, where a rectangular image is equally divided and patched)

Therefore, the inventors of the present invention add overlap width portions of an arbitrary width to the opposite ends of each of divisional pieces obtained by equal division as seen in FIGS. 32 and 33. For example, macro blocks (it is assumed here that the omnidirectional video image is coded in accordance with the MPEG-2 system) of portions to be connected at the opposite ends are added (it should be understood that the numerical values in the figures correspond to serial numbers of the macro blocks). By utilization of such additional pixel blocks like overlap widths, an accurate interpolation process is performed also at a folded back point, and a normal image on which such a surplus line as shown in FIG. 31 does not appear is produced.

It is to be noted that a GPU generally is equipped with a function called "CLAMP" and can dispose a texture repeatedly. However, where a rectangular image is folded back into two as seen in FIG. 23, since the left end and the right end do not coincide with each other, even if the CLAMP function is used, an appropriate image is not produced.

The foregoing coordinate conversion process is calculated for all of the apexes (TX, TY) of the primitives, and pairs of the coordinates (tx, ty) and the viewpoint direction image coordinates (xf, yf) of the apexes of the primitives on the texture buffer and the omnidirectional video image to which the overlap widths are added are transferred to the GPU. Then, the GPU produces a viewpoint direction image and transfers it to the video image display apparatus 54.

B-2-3. Video Image Reproduction of a Two-Dimensional Image Mapped based on a Mathematical Technique It is described hereinabove that, by extracting sample points uniformly from a spherical surface based on a mathematical technique of the Stratified Random or the Hammersley Sequence and mapping the sample points on a two-dimensional planar image, a non-planar image can be mapped on a two-dimensional plane such that the amount of information included in pixels may be kept equal in omnidirections.

Here, description is given of a processing procedure for reproducing a three-dimensional shape video image in an arbitrary viewpoint direction using a two-dimensional image mapped based on such a mathematical technique as described above. FIG. 34 schematically illustrate flows of data for reproducing a three-dimensional shape video image in an arbitrary viewpoint direction from a two-dimensional image mapped based on a mathematical technique.

While pixels can be sampled uniformly from a spherical surface by a two-dimensional image mapping method based on the Stratified Random or the Hammersley Sequence, since adjacent pixels are not mapped in an adjacent relationship with each other by the Stratified Random or the Hammersley Sequence, in order to interpolate a pixel value at a point ($\Theta$, $\Phi$) when an omnidirectional video image is to be displayed or reproduced from a two-dimensional image, adjacent pixels must be searched out efficiently.

Thus, in the present embodiment, as a pre-process for synthesis of a three-dimensional shape video image, mapping information is utilized to calculate four (or a plurality of) adjacent pixels $(\Theta_i^{(1)}, \Phi_j^{(1)})$, $(\Theta_i^{(2)}, \Phi_j^{(2)})$, $(\Theta_i^{(3)}, \Phi_j^{(3)})$ and $(\Theta_i^{(4)}, \Phi_j^{(4)})$ neighboring with each sample point $(\Theta_i, \Phi_j)$ on a polar coordinate system to produce a lookup table $T(\Theta, \Phi)$ for searching for adjacent pixels with regard to the pixel size W×H of a two-dimensionally mapped omnidirectional image.

After such a pre-process as described above, for each pixel (x, y) of a viewpoint direction video image, polar coordinates ($\Theta$, $\Phi$) are determined by calculation from the viewpoint direction ($\theta_v$, $\Phi_v$) and the zoom value z passed from the viewpoint designation apparatus 52.

Then, the lookup table $T(\Theta, \Phi)$ is referred to search for pixels neighboring with the polar coordinates ($\Theta$, $\Phi$) corresponding to the pixel (x, y) in the viewpoint direction video image.

Then, the adjacent pixels are used to interpolate a pixel at the polar coordinates ($\Theta$, $\Phi$). As the interpolation method, the closest interpolation, linear interpolation, cubic interpolation, sinc interpolation, spline interpolation and so forth can be used.

Thereafter, the two-dimensional image mapping information is referred to convert the polar coordinates ($\Theta$, $\Phi$) into omnidirectional image coordinates (TXf, TYf).

Such conversion as described above is performed for the entire viewpoint direction image (x, y), and a viewpoint direction image is produced from the omnidirectional image coordinates (TX, TY) and transferred to the video image display apparatus 54.

B-3. Lens Effect

When conversion between a polar coordinate system and a two-dimensional image coordinate system is performed, various lens effects can be added in both of the pixel system and the region system. The conversion expressions given respectively for the systems described above are applied to an ideal pinhole camera.

A conversion expression when an omnidirectional video image is displayed as a video image picked up with a fisheye lens is such as given below. A viewpoint image produced where a fisheye lens is used is shown in FIG. 35.

$$(X,Y)=(r(\Phi)\cos\Theta, r(\Phi)\sin\Theta)$$

$$r(\Phi)=f1\Phi+f2\Phi^2+\ldots \quad (12)$$

B-4. Synthesis of an Arbitrary Three-Dimensional Shape

The viewpoint direction video image and three-dimensional shape video image production section 63 can use two-dimensional image mapping information to produce a three-dimensional shape video image in accordance with a viewpoint direction and a zoom value designated from the user through the viewpoint designation apparatus 52. More particularly, the viewpoint direction video image and three-dimensional shape video image production section 63 uses a function of patching a texture to a three-dimensional shape equipped by the GPU which forms the arbitrary viewpoint direction video image synthesis apparatus 53 to refer to distance information of two-dimensional image mapping information to patch an omnidirectional video image to a three-dimensional shape is described. Accordingly, the omnidirectional image can be reproduced in an arbitrary shape when it is observed from the outside.

In the following, a process for synthesizing an omnidirectional video image mapped on a two-dimensional surface in an arbitrary outside three-dimensional shape is described. FIG. 36 schematically illustrates flows of data for synthesizing a video image of an arbitrary three-dimensional shape from an omnidirectional video image mapped on a two-dimensional plane.

First, two-dimensional image mapping information is referred to convert an omnidirectional video image in a unit of a primitive such that omnidirectional image coordinates (TX, TY) for each of apexes of primitive of the omnidirectional video image into polar coordinates ($\Theta$, $\Phi$, r). The primitive is a plotting unit formed from a triangle or a quadrangle, and a GPU generally performs plotting in a unit of a primitive.

Then, the polar coordinates ($\Theta$, $\Phi$, r) are converted into three-dimensional coordinates (X, Y, Z) based on the polar coordinates ($\Theta$, $\Phi$, r) and the viewpoint direction ($\theta_v$, $\Phi_v$) and the parallel movement amounts ($X_v, Y_v, Z_v$) passed from the viewpoint designation apparatus 52. A conversion expression is given below:

$$(Xf,Yf,Zf)=(r\sin\theta_v\cos\phi_v, r\sin\phi_v, r\cos\theta_v\cos\phi_v)$$

$$(X,Y,Z)=(R\times(Xf,Yf,Zf)+(X_v,Y_v,Z_v)) \quad (13)$$

Then, the omnidirectional video image is transferred as a texture to the GPU (or the texture buffer in the VRAM (Video Random Access Memory) prepared in the GPU). Then, a pair of omnidirectional image coordinates (TX, TY) and three-dimensional coordinates (X, Y, Z) of each of the apexes of the primitives are transferred to the GPU together with an instruction to produce a three-dimensional shape video image in a unit of a primitive. In this instance, the interpolation technique equipped in the GPU can be used. As the interpolation method, the closest interpolation, linear interpolation, cubic interpolation sinc interpolation, spline interpolation and so forth can be used.

Figure 37:
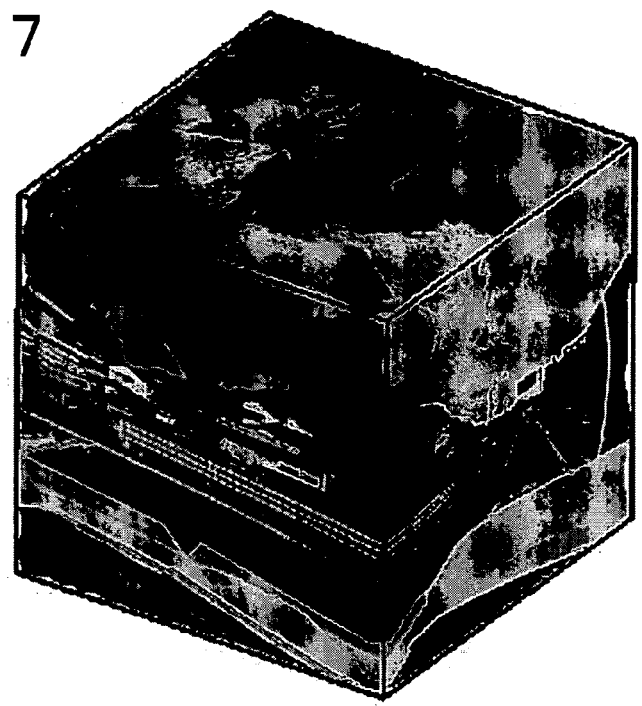
FIG. 37 is a view illustrating an example of an arbitrary three-dimensional shape synthesized from an omnidirectional video image mapped on a two-dimensional plane and more particularly is a view illustrating a manner wherein an omnidirectional video image is patched to the outer side of a cube.
Figure 38:
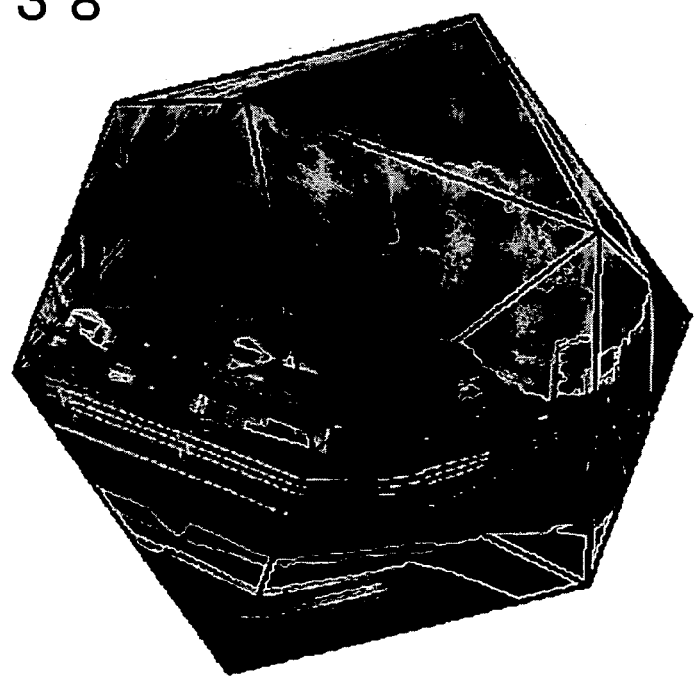
FIG. 38 is a view illustrating an example of an arbitrary three-dimensional shape synthesized from an omnidirectional video image mapped on a two-dimensional plane and more particularly is a view illustrating a manner wherein an omnidirectional video image is patched to the outer side of a regular icosahedron.
Figure 39:
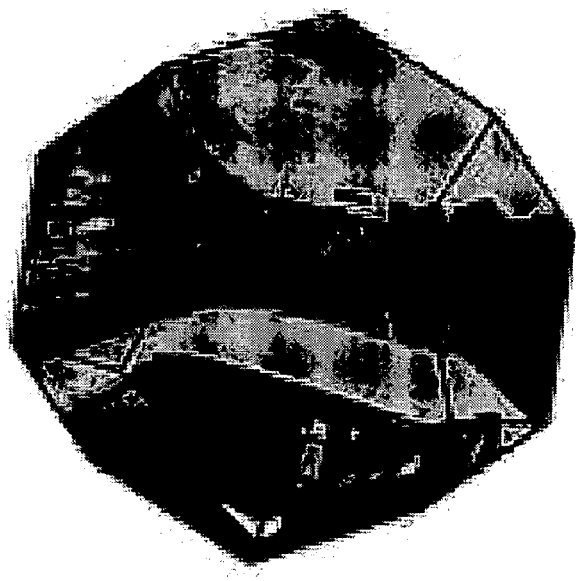
FIG. 39 is a view illustrating an example of a video image of an arbitrary three-dimensional shape synthesized from an omnidirectional video image mapped on a two-dimensional plane and more particularly is a view illustrating a manner wherein an omnidirectional video image is patched to the outer side of a regular dodecahedron.
Figure 40:
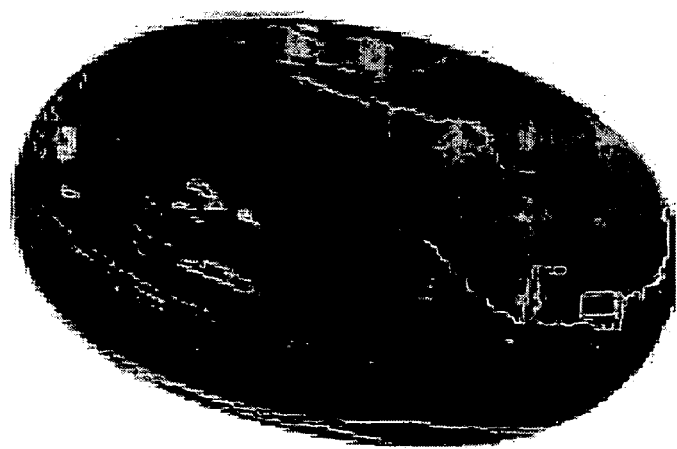
FIG. 40 is a view illustrating an example of a video image of an arbitrary three-dimensional shape synthesized from an omnidirectional video image mapped on a two-dimensional plane and more particularly is a view illustrating a manner wherein an omnidirectional video image is patched to the outer side of a doughnut-shaped body.

FIGS. 37 to 40 show examples of a video image of an arbitrary three-dimensional shape synthesized from an omnidirectional video image mapped on a two-dimensional plane. FIG. 37 illustrates a manner wherein the omnidirectional video image is patched to the outer side of a cube. Similarly, FIGS. 38, 39 and 40 illustrate manners wherein the omnidirectional video image is patched to the outer sides of a regular icosahedron, a regular dodecahedron and a doughnut (torus), respectively.

For example, if the distance 1 is added to all pixels, then a sphere of a radius 1 is obtained, and if arbitrary r is allocated, then an arbitrary shape can be regenerated. Through this, production or utilization of a three-dimensional GUI (Graphical User Interface) which has not conventionally been available can be achieved.

Postscript

The present invention has been described in detail above with reference to a particular embodiment. However, it is apparent that those skilled in the art can modify or alter the embodiment without departing from the spirit and scope of the present invention. In other words, the present invention has been disclosed by way of illustration and shall not be interpreted restrictively. In order to determine the spirit and the scope of the present invention, the claims shall be taken into consideration.

INDUSTRIAL APPLICABILITY

According to the present invention, a superior image processing apparatus and image processing method, recording medium and computer program which can suitably perform such processes as compression, storage and reproduction for an image formed as a non-planar image by patching video image data picked up by a plurality of cameras can be provided.

Further, according to the present invention, a superior image processing apparatus and image processing method, recording medium and computer program which can suitably perform a process for a cylindrical or spherical image picked up by an omnidirectional camera or full celestial globe type camera formed from a plurality of cameras disposed so as to pickup images around a certain one point in a space determined as a viewpoint can be provided.

Furthermore, according to the present invention, a superior image processing apparatus and image processing method, recording medium and computer program which can store and process such a non-planar image as an omnidirectional video image taking the performance of the display or reproduction side into consideration can be provided.

According to the present invention, the picture quality or the real-time performance can be raised by the display or reproduction apparatus side by editing an omnidirectional video image in accordance with the compression format and the performance of the display apparatus.

Generally, not only when information is transmitted through a network but also when information is read from a recording medium such as a DVD, some limitation is frequently applied to the bit rate. Where such a non-planar image as an omnidirectional video image is compressed and stored in accordance with the present invention, a maximum amount of information can be placed into such a limited bit rate as just described.

Further, according to the present invention, when an arbitrary viewpoint direction video image is synthesized from an omnidirectional video image, various special effects can be utilized by falsely reproducing video images picked up by various lenses.

Furthermore, according to the present invention, new GUI (Graphical User Interface) environment can be provided by applying a function of reproducing an omnidirectional video image not only from the inner side but also in an arbitrary shape from the outer side.

The invention claimed is:

1. An image processing apparatus for displaying a non-planar image of a three-dimensional coordinate system mapped on a two-dimensional planar image as a video image, the image processing apparatus comprising:

an indication means for designating at least one of a viewpoint direction and a zoom value, and a video image production means for producing a three-dimensional shape video image in an arbitrary viewpoint direction in accordance with at least one of the designated viewpoint direction and the zoom value using mapping information when the non-planar image is mapped to the two-dimensional plane image, wherein the video image production means comprises a means for converting omnidirectional image coordinates of each of apexes of primitives included in the omnidirectional video image mapping information into polar coordinates using the two-dimensional image mapping information, a means for converting the polar coordinates into viewpoint direction image coordinates from at least one of the viewpoint direction and the zoom value, and a means for producing a viewpoint direction image in a unit of a primitive using the omnidirectional video image as a texture.

2. An image processing apparatus according to claim 1, wherein the video image production means performs re-mapping from the non-planar video image mapped on the two-dimensional plane to a two-dimensional display screen of a video image display apparatus.

3. An image processing apparatus according to claim 1, wherein the video image production means comprises a means for calculating polar coordinates from at least one of the viewpoint direction and the zoom value of each of the pixels of the viewpoint direction video image, and a means for referring to the two-dimensional image mapping information to convert the polar coordinates into omnidirectional image coordinates.

4. An image processing apparatus according to claim 1, wherein the video image production means further comprises a means for interpolating a pixel based on adjacent pixels of the omnidirectional video image.

5. An image processing apparatus according to claim 1, wherein the video image production means comprises a means for disposing, upon pixel interpolation, in the proximity of each of the opposite left and right ends of the omnidirectional image, a pixel region duplicated by a predetermined width from the other end.

6. An image processing apparatus according to claim 1, wherein the video image production means comprises a means for producing a lookup table for searching for adjacent pixels with regard to each of pixels of the two-dimensionally mapped omnidirectional image, a means for calculating polar coordinates from the viewpoint direction and zoom value of each of the pixels of the viewpoint direction video image, a means for referring to the lookup table to search for pixels neighboring with the coordinates corresponding to the pixel of the viewpoint direction video image, a means for interpolating the polar coordinates of the pixel using the adjacent pixels, and a means for referring to the two-dimensional image mapping information to convert the polar coordinates into the omnidirectional image coordinates.

7. An image processing apparatus according to claim 1, wherein the video image production means falsely realizes video images picked up by cameras of different types of lenses when the viewpoint is on the inner side upon synthesis of an arbitrary viewpoint direction video image.

8. An image processing apparatus according to claim 1, wherein the video image production means produces an omnidirectional video image of an arbitrary three-dimensional shape when the viewpoint is on the outer side upon synthesis of an arbitrary viewpoint direction video image.

9. An image processing method for displaying a non-planar image of a three-dimensional coordinate system mapped on a two-dimensional planar image as a video image, the image processing method comprising:
designating at least one of a viewpoint direction and a zoom value, and
producing a three-dimensional shape video image in an arbitrary viewpoint direction in accordance with at least one of the designated viewpoint direction and the zoom value using mapping information when the non-planar image is mapped to the two-dimensional plane image,
wherein producing a three-dimensional shape video image comprises converting omnidirectional image coordinates of each of apexes of primitives included in the omnidirectional video image mapping information into polar coordinates using the two-dimensional image mapping information, converting the polar coordinates into viewpoint direction image coordinates from at least one of the viewpoint direction and the zoom value, and producing a viewpoint direction image in a unit of a primitive using the omnidirectional video image as a texture.

10. An image processing method according to claim 9, wherein producing a three-dimensional shape video image further comprises re-mapping from the non-planar video image mapped on the two-dimensional plane to a two-dimensional display screen of a predetermined video image display apparatus.

11. An image processing method according to claim 9, wherein producing a three-dimensional shape video image further comprises calculating polar coordinates from at least one of the viewpoint direction and the zoom value of each of the pixels of the viewpoint direction video image, and referring to the two-dimensional image mapping information to convert the polar coordinates into omnidirectional image coordinates.

12. An image processing method according to claim 9, wherein producing a three-dimensional shape video image further comprises interpolating a pixel based on adjacent pixels of the omnidirectional video image.

13. An image processing method according to claim 9, wherein producing a three-dimensional shape video image further comprises disposing, upon pixel interpolation, in the proximity of each of the opposite left and right ends of the omnidirectional image, a pixel region duplicated by a predetermined width from the other end.

14. An image processing method according to claim 9, wherein producing a three-dimensional shape video image further comprises producing a lookup table for searching for adjacent pixels with regard to each of pixels of the two-dimensionally mapped omnidirectional image, calculating polar coordinates from the viewpoint direction and zoom value of each of the pixels of the viewpoint direction video image, referring to the lookup table to search for pixels neighboring with the coordinates corresponding to the pixel of the viewpoint direction video image, interpolating the polar coordinates of the pixel using the adjacent pixels, and referring to the two-dimensional image mapping information to convert the polar coordinates into the omnidirectional image coordinates.

15. An image processing method according to claim 9, wherein producing a three-dimensional shape video image falsely realizes video images picked up by cameras of different types of lenses when the viewpoint is on the inner side upon synthesis of an arbitrary viewpoint direction video image.

16. An image processing method according to claim 9, wherein producing a three-dimensional shape video image produces an omnidirectional video image of an arbitrary three-dimensional shape when the viewpoint is on the outer side upon synthesis of an arbitrary viewpoint direction video image.

17. A computer-readable media storing a program for causing a computer to execute a method for displaying a non-planar image of a three-dimensional coordinated system mapped on a two-dimensional planar image as a video image is executed on a computer system, the method comprising:
designating at least one of a viewpoint direction and a zoom value, and
producing a three-dimensional shape video image in an arbitrary viewpoint direction in accordance with at least one of the designated visual point direction and the zoom value using mapping information when the non-planar image is mapped to the two-dimensional plane image,
wherein producing a three-dimensional shape video image comprises converting omnidirectional image coordinates of each of apexes of primitives included in the omnidirectional video image mapping information into polar coordinates using the two-dimensional image mapping information, converting the polar coordinates into viewpoint direction image coordinates from at least one of the viewpoint direction and the zoom value, and producing a viewpoint direction image in a unit of a primitive using the omnidirectional video image as a texture.

* * * * *